(12) United States Patent
Valliath et al.

(10) Patent No.: US 8,072,479 B2
(45) Date of Patent: *Dec. 6, 2011

(54) METHOD SYSTEM AND APPARATUS FOR TELEPRESENCE COMMUNICATIONS UTILIZING VIDEO AVATARS

(75) Inventors: George T. Valliath, Winnetka, IL (US); Eric R. Buhrke, Clarendon Hills, IL (US); Mark A. Tarlton, Buffalo Grove, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1372 days.

This patent is subject to a terminal disclaimer.

(21) Appl. No.: 11/422,438

(22) Filed: Jun. 6, 2006

(65) Prior Publication Data
US 2006/0210045 A1    Sep. 21, 2006

Related U.S. Application Data

(63) Continuation-in-part of application No. 10/331,697, filed on Dec. 30, 2002, now Pat. No. 7,106,358.

(51) Int. Cl.
*G06F 15/16* (2006.01)
(52) U.S. Cl. .................... 348/14.01; 715/762
(58) Field of Classification Search ..... 348/14.01–14.16
See application file for complete search history.

(56) References Cited

U.S. PATENT DOCUMENTS

| | | | |
|---|---|---|---|
| 4,400,724 A | * | 8/1983 | Fields ............ 348/14.1 |
| 5,347,306 A | | 9/1994 | Nitta |
| 5,500,671 A | * | 3/1996 | Andersson et al. ...... 348/14.1 |
| 5,583,808 A | | 12/1996 | Brahmbhatt |
| 5,999,208 A | | 12/1999 | McNerney et al. |

(Continued)

FOREIGN PATENT DOCUMENTS

| | | | |
|---|---|---|---|
| JP | 07-038873 | * | 2/1995 |
| JP | 411234640 A | * | 8/1999 |
| WO | WO 2004-062257 A2 | | 7/2004 |

OTHER PUBLICATIONS

Melur Ramakrishnaiah, "PCT/US2003/040353—PCT International Search Report," WIPO, ISA/US, Commissioner for Patents, Alexandria, VA, USA, Oct. 12, 2004.

(Continued)

*Primary Examiner* — Curtis Kuntz
*Assistant Examiner* — Maria El-Zoobi

(57) ABSTRACT

An apparatus, system and method for telepresence communications in an environment of a virtual location between two or more participants at multiple locations. First perspective data descriptive of the perspective of the virtual location environment experienced by a first participant at a first location and feature data extracted and/or otherwise captured from a second participant at a second location are processed to generate a first virtual representation of the second participant in the virtual environment from the perspective of the first participant. Likewise, second perspective data descriptive of the perspective of the virtual location environment experienced by the second participant and feature data extracted and/or otherwise captured from features of the first participant are processed to generate a second virtual representation of the first participant in the virtual environment from the perspective of the second participant. The first and second virtual representations are rendered and then displayed to the first and second participants, respectively. The first and second virtual representations are updated and redisplayed to the participants upon a change in one or more of the perspective data and feature data from which they are generated. The apparatus, system and method are scalable to two or more participants.

40 Claims, 16 Drawing Sheets

U.S. PATENT DOCUMENTS

| | | | |
|---|---|---|---|
| 6,119,147 | A | 9/2000 | Toomey et al. |
| 6,313,864 | B1 * | 11/2001 | Tabata et al. ............... 348/14.02 |
| 6,466,250 | B1 * | 10/2002 | Hein et al. ................. 348/14.16 |
| 6,583,808 | B2 * | 6/2003 | Boulanger et al. ......... 348/14.09 |
| 6,771,303 | B2 * | 8/2004 | Zhang et al. ............... 348/14.16 |
| 6,806,890 | B2 * | 10/2004 | Audleman et al. ............ 715/762 |
| 7,532,230 | B2 * | 5/2009 | Culbertson et al. ........ 348/14.08 |
| 2002/0018070 | A1 | 2/2002 | Lanier |
| 2003/0043260 | A1 * | 3/2003 | Yap et al. ................... 348/14.06 |
| 2003/0218672 | A1 * | 11/2003 | Zhang et al. ............... 348/14.16 |
| 2004/0130614 | A1 * | 7/2004 | Valliath et al. ............. 348/14.01 |

OTHER PUBLICATIONS

"Notification of the First Office Action," Patent Office of the People's Republic of China, Beijing, China, Jun. 6, 2008.

Paul Luckett, "European 1st Office Action," European Patent Office, Munich, Germany, May 25, 2009.

Paul Luckett, "Supplementary European Search Report," European Patent Office, Munich, Germany, Feb. 5, 2009, 3 pages.

\* cited by examiner

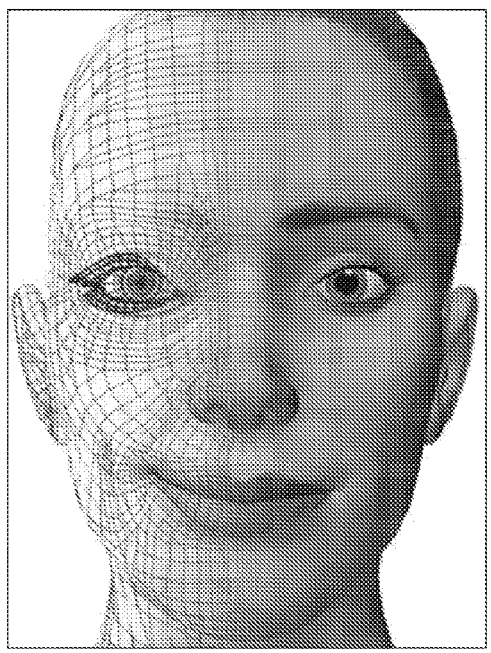
FIG.9
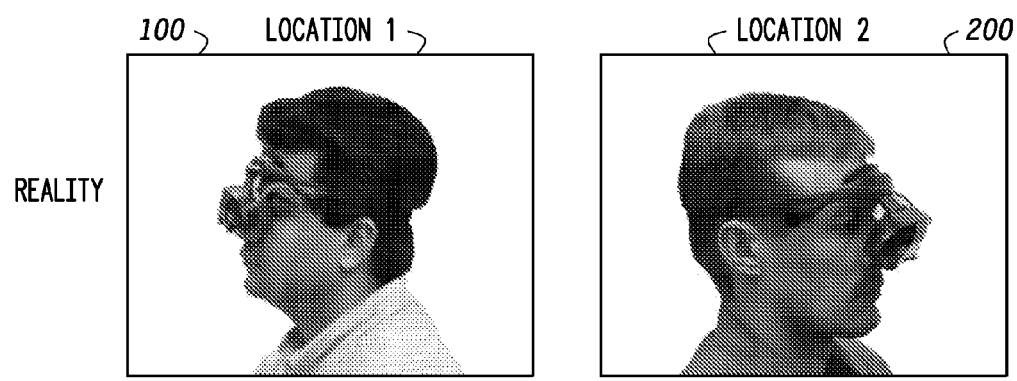
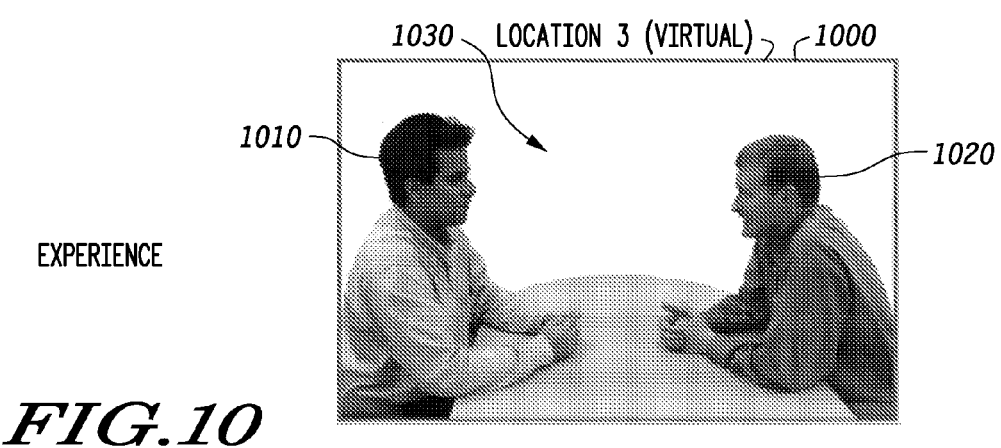
FIG.10

METHOD SYSTEM AND APPARATUS FOR TELEPRESENCE COMMUNICATIONS UTILIZING VIDEO AVATARS

TECHNICAL FIELD

This invention relates to interpersonal communication using audiovisual technology and more specifically to methods and systems for the transmission and reception of audiovisual information.

BACKGROUND OF THE INVENTION

There are many situations in which one or more individuals would like to observe and possibly interact with objects or other individuals. When two or more individuals need to meet and discuss issues of mutual interest, a common approach is a physical (face-to-face) meeting. This type of meeting has the advantage of direct personal contact and gives the individuals the ability to communicate most effectively, since eye contact may be maintained, and physical gestures such as facial expressions, hand movements, and body posture are readily evident. For most meetings, this is the preferred medium of exchange since large amounts of information may be exchanged transparently if the information is at the location of the meeting.
In certain situations, such as communication over long distances, arranging such face-to-face meetings can be time-consuming or prohibitively expensive. In these situations, the most common way to exchange information is over the telephone, via e-mail or by teleconferencing. Each of these approaches has serious drawbacks. Telephone conversations provide none of the visual cues that may be important when making a business decision. Telephone conversations are also difficult to manage when more than two individuals need to be involved in the meeting. E-mail or regular postal services are much slower than an in-person meeting and provide none of the visual or even audio cues that are present in in-person meetings. The use of video teleconferencing equipment allows individuals at remote locations to meet and exchange information through the use of audio/visual communication.

There is, however, a substantial difference between an in-person meeting between two or more people and a meeting using a video teleconferencing system. The latter does not provide the same experience as the former. In an in-person meeting, we see the other person in three dimensions, in color and at the right size, and each participant at their appropriate physical position. More importantly, we have the ability to make and maintain eye contact. This visual information contributes to a sense of presence of the individual. The current state of the art in video teleconferencing provides none of these benefits. Video teleconferencing also does not provide the nuances of facial and body movement available from a personal meeting, since the entire image is transmitted at the same scale. Therefore, the in-person impact of a frown or smile is likely to be greater than when using a video teleconferencing system since the correct aspect and detail of the area around the mouth is not transmitted in a video teleconference. Moreover, exchange of non-personal information, such as reports, documents, etc., resident at a particular location to others participating in a teleconference may be limited. It is therefore difficult to transmit personal and non-personal information of a desirable quality and quantity using existing teleconferencing technology.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 9 illustrates an exemplary three-dimensional model, in accordance with certain embodiments of the present invention.

FIG. 10 illustrates a simplified teleconference between first and second participants at a virtual location, in accordance with certain embodiments of the present invention.

DETAILED DESCRIPTION

Figure 1:
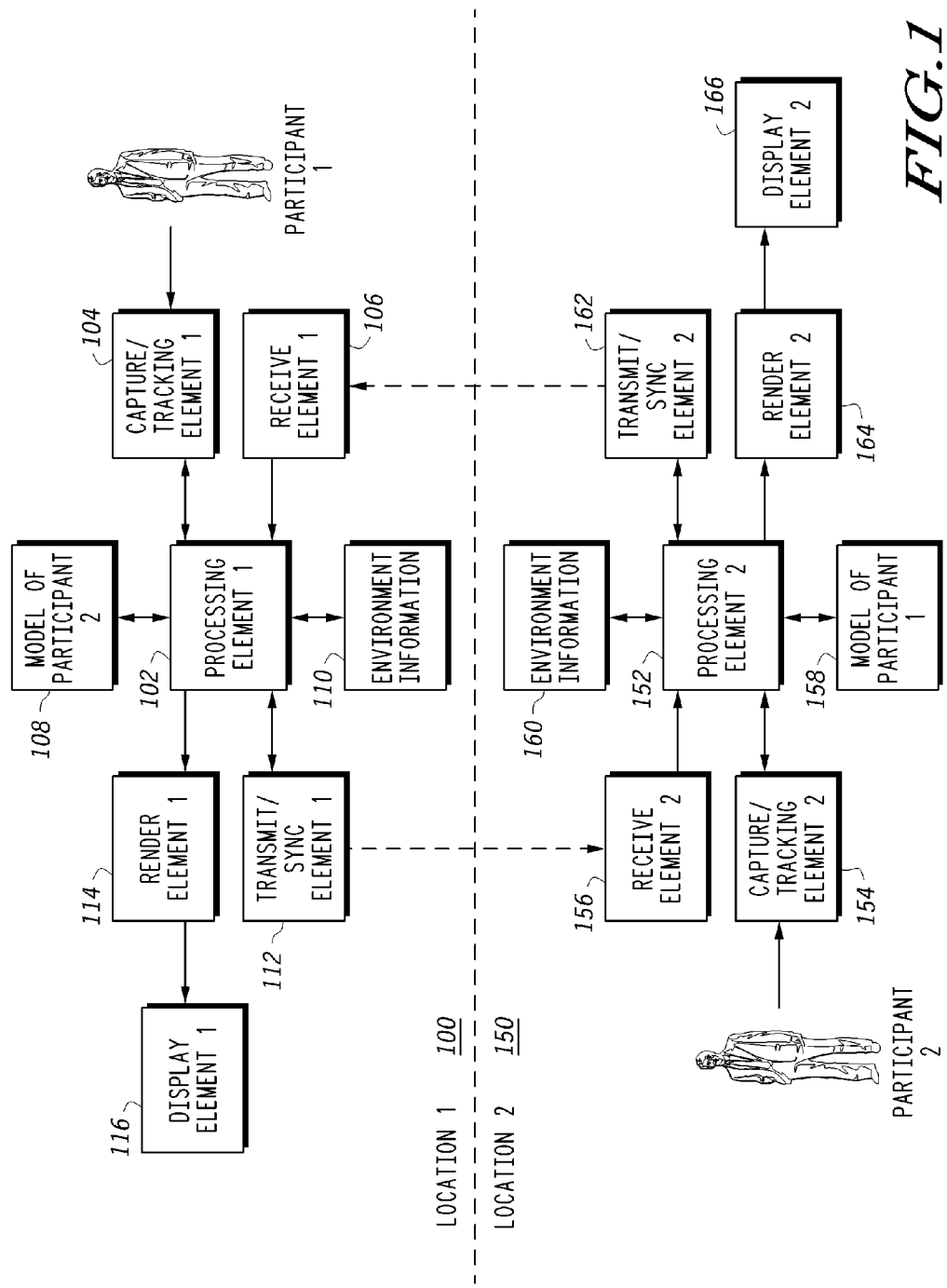
FIG. 1 is a block diagram of a system that supports virtual teleconferencing, in accordance with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings Referring now to FIG. 1, a block diagram of a system that supports a virtual teleconference at a virtual location between a first participant at a first location 100 and a second participant at a second location 200 is shown. The system provides for the collection, processing and display of audiovisual information concerning one or more remotely located participants to a local participant in a manner that has telepresence, as will be described. The collection and processing of audiovisual information from both remote participants and a local participant, as well as interaction between remote and local participants and environment description of the virtual location, allows for the generation, updating and display of one or more virtual representations or avatars of remote participants in the environment of the virtual location of the teleconference to be made to the local participant, from the perspective of the local participant. The telepresence teleconferencing of the present invention is scalable to any number of participants. As used herein, virtual representations or avatars may refer to either the video and/or the rendered representation of the user.

The functionality shown in FIG. 1 may be employed for each participant beyond Participant 1 and Participant 2 that is added to the virtual teleconference, subject to available memory and latency requirements, with stored model information about the added participants made available to each of the other participants in the teleconference to facilitate the generation of virtual representations or avatars of all remote participants in the teleconference to any given local participant.

There is a capture/tracking element 104, 204, respectively, that captures cued data generated by features of the participants 1, 2. As used herein, cued data refers to data generated by certain monitored features of a participant, such as the mouth, eyes, face, etc., suitable for cuing their capture and tracking by capture/tracking elements 104, 204, respectively and that provide information that enhances the sense of actual presence, referred to as telepresence, experienced by participants in the virtual location of the teleconference. Cued data may be visual and/or audio. Cued visual data refers to the capture of the movement of such features may be cued by movement of the feature, such as movement of an eyebrow, the mouth, a blink, etc., or it may be cued to automatically update periodically. Cued data may have an audio component as well and capture of cued audio data may be triggered by the sound produced by a participant's mouth or movement of the mouth itself. Additional cued visual data to be collected may be movement of the hands, the head, the torso, legs, etc. of a participant. Gestures, such as head nods, hand movement, and facial expressions, are important to clarify or enhance meaning, generally augmenting the communication experience and thus are important to enhance the telepresence of the present invention. The capture elements 104, 204 additionally may have the ability to track movement of certain of the features they are monitoring, as will be explained. Suitable capture elements may include cameras, microphones, and head tracking equipment. Any number of capture elements may be used. For instance, there may be a camera devoted to capturing and tracking movement of each eye of a participant, another devoted to capturing facial movements, such as mouth movement, and a microphone for capturing any sounds uttered by the participant. Moreover, the proximity of the data capturing devices to the participant whose movements and sounds are being captured may vary. In a head mounted display, the eye, face, mouth, head tracking, etc. capture elements may be located inside the eyewear of the head mounted display. Or, the capture elements may be a series of cameras located on a desk, table or other area proximate the participant.

One mechanism that incorporates the data capture components into a single integrated system is a specially designed pair of eyeglasses. The eyeglasses are capable of collecting eye and facial tracking information, as well as audio information through the use of a boom, a collection device that may have a single point of attachment to a head-mounted data capture element.

The cued data gathered from a participant is processed by a processing element 102, 104 to extract recognized and selected feature data, such as pupil movement, eyebrow movement, mouth movement, etc., from the raw cued data captured by the capture elements 104, 204. This extracted feature data of the local participant may then be transmitted by transmit elements 112, 162 for receipt by processors associated with remote participants, where it will be used, along with other data, such as environment and perspective data, to generate a virtual representation of the local participant in the virtual environment for viewing by one or more remote participants from the perspective of the remote participants.

In addition to capturing cued visual data from a participant, the capture elements 104, 204 additionally are tasked with capturing perspective data from the participant 1, 2, respectively. It is noted that perspective data may be captured by capture elements that are different or disjoint from capture elements 102, 204. Perspective data refers to any orientation or movement of the participant being monitored that may affect what is experienced by the participant in the virtual environment of the teleconference. Perspective data may thus include movement of the head or a re-orientation, such as turning, of the participant's body. For instance, if the virtual environment of the teleconference is to provide the sense that participants 1 and 2 are seated across from each other at a virtual conference table, then the acts of participant 1 moving his head, standing up, leaning forward towards participant 2, etc. may each be expected to change what is seen or heard by participant 1 in the virtual environment, and thus the perspective of the environment of the virtual location experienced by participant 1 is said to have changed. Capturing and tracking movement, re-orientation, or other perspective data of a participant provides one of the types of data that is used to process and generate a believable teleconference at the virtual location for the participant. Suitable capturing/tracking elements for capturing perspective data may include cameras or other motion tracking elements such as magnetometers that use the magnetic field of the earth and accelerometers that measure acceleration, or other devices used to determine the direction and orientation of movement of the head or other parts of the body that can affect the perspective of the virtual environment that is experienced by a participant.

Data about the one or more participants at remote locations is additionally needed to generate a virtual representation of the remote participants in the virtual environment from the perspective of a local participant. Receive elements 106, 206, functionally associated with participants 1 and 2, respectively, receive cued visual data captured from one or more remote participants and transmitted over the system by remote transmit elements 112, 162 as described above. Thus, for the simplified system of FIG. 1, receive element1 106 will receive from transmit element 162 extracted feature data extracted and processed by processing element2 152 from cued visual data captured by capture/tracking element2 154 from Participant 2 and transmitted by transmit element2 156.

Similarly, receive element2 156 will receive from transmit element1 112 extracted feature data extracted and processed by processing element1 102 from cued visual data captured by capture/tracking element1 104 from Participant 1 and transmitted by transmit element1 112. Again, the system of FIG. 1 is scalable, meaning there may be more than two participants, in which case the extracted feature data received by receive elements 106, 156 would be from two or more remote participants.

With the receipt of extracted, remote feature data by the receive element associated with a participant, the local processing element now has enough information to generate one or more virtual representations of the one or more remote participants in the virtual environment from the local participant's perspective. In addition to the extracted feature data of a remote participant received by the local receive element, the processing element associated with the local participant has the perspective data captured from the local participant, a model of the remote participant, and information that defines what the visual and audio configuration of the environment of the virtual location at which the virtual teleconference takes place. The processing element thus processes this information to generate a virtual representation of the remote participant in the virtual environment as seen from the perspective of the local participant. This processing may be performed by the processing element to generate virtual representations from the perspective of the local participant in the virtual environment for each remote participant that transmits its visual and/or audio information to the local receiver element.

Visual extracted feature data of the remote participant may be put together with a model of the remote participant (108, 158) that is stored and accessible to the processing element associated with the local participant. The stored model may be a two-dimensional or three-dimensional (3D) computer model upon which the received extracted feature data may be used to update the model. The model may additionally be just the head, bust or some larger model of the remote participant. It may be that only head or face portion of the model is individual to the remote participant, with the rest of the virtual representation of the remote participant being supplied by a stock avatar. The portion of the virtual representation of the remote participant that is individualized by the use of the participant-specific model 108, 158 may well be affected by factors such as the amount and quality of cued data that is collected and the amount of processing power and time to be dedicated to this task. If only eye, mouth, and face data are captured from the remote participant, then it would sufficient to store only a participant-specific model of the head of the remote participant upon which the collected and extracted feature data may be overlaid, for example. An example of a 3D model is described in conjunction with FIG. 9.

Information about the environment 110, 160 of the virtual location where the teleconference is to take place is also processed by the local processing element when generating the virtual representation of a remote participant. Environment data expresses the set-up of the virtual conference, with the relative positions of each of the participants in it and the visual backdrop, such as the location of conference table, windows, furniture, etc. to be experienced by the participants. Movement of a participant, by either head or body movement, by one or more teleconference participants may change the perspective from which the participant sees this environment and so must be tracked and accounted for when generating the virtual representation of the remote participant that will be displayed to the local participant. Again, the processing element that generates the virtual representation for the local participant is operable to generate virtual representations in this manner for each participant in the virtual teleconference for which cued data is received.

Figure 3:
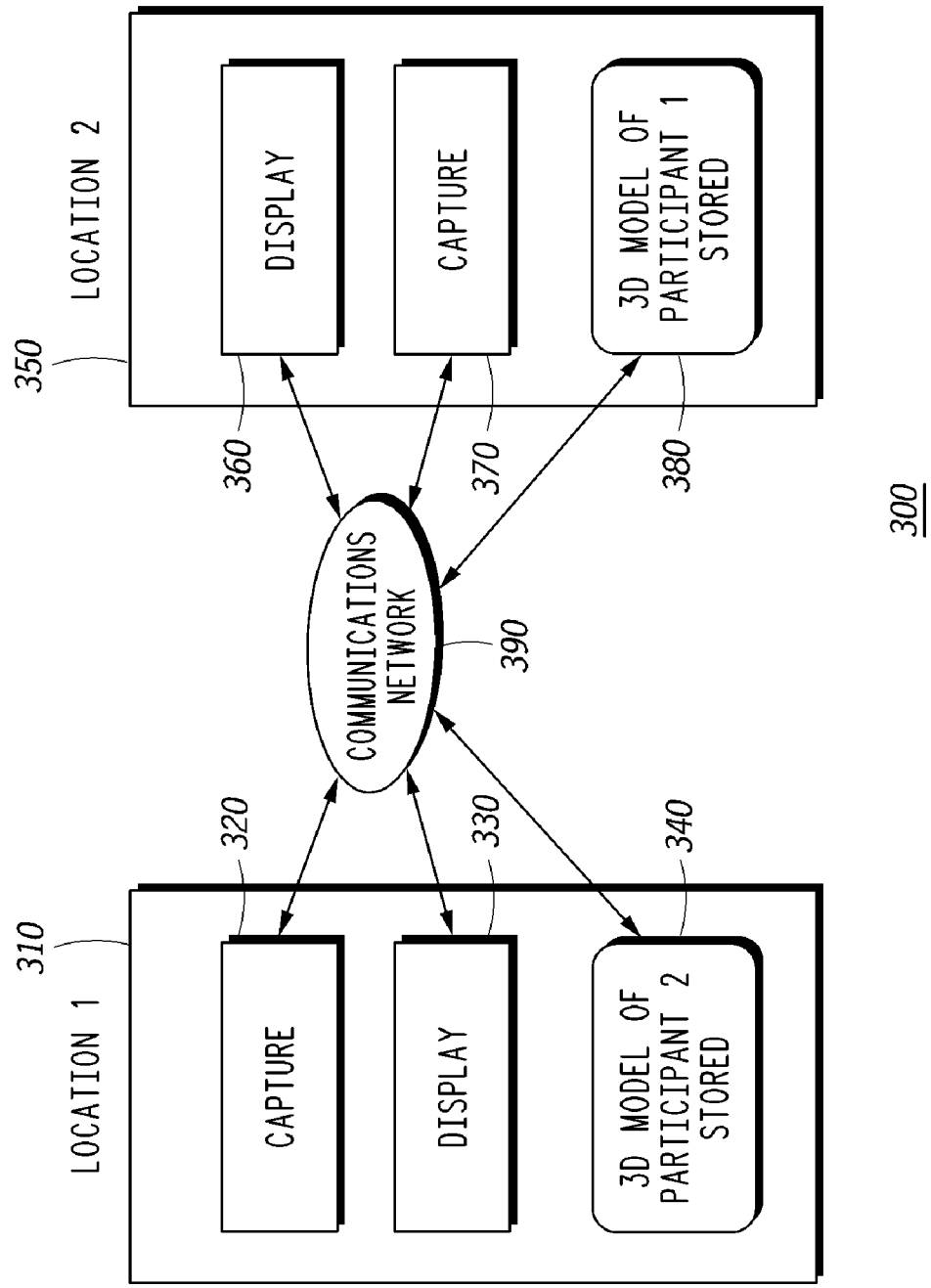
FIG. 3 is a block diagram of virtual teleconferencing, in accordance with certain embodiments of the present invention.

The processing elements 1 and 2, shown as elements 102 and 152, respectively, need not necessarily reside at the participants' locations. Additionally, they need not necessarily be one discrete processor and may indeed encompass many processing elements to perform the various processing functions as will be described. It is further envisioned that there may be a central processing element, which would encompass both processing element1 102 and processing element2 152 and which may further be physically located in a location different from locations 100 and 200. This is illustrated in block diagram 300 of FIG. 3 in which the processing of captured local feature and perspective data and remote data need not be performed at local locations, such as Location 1 and Location 2, and may indeed be provided by processing capabilities of communication network 390. The captured data of participants 1 and 2 are transmitted remotely using communications network 390. In a certain embodiment of the present invention, communications network 390 is a high bandwidth, low latency communications network. For instance, data may be communicated at 20 fps with a 150 mS latency over a standard Internet IP link.

Models of remote participants 340, 380 are shown at local locations, but this is not required, particularly as the processing element or elements are to be located on the communication network; the stored model may be a 3D computer model as shown. 3D models are useful to store image information that does not rapidly change, and thereby allows the amount of data that must be transmitted across communications network 390 to be reduced. After receiving remote image data, data display components 330 and 360 are operable to update the 3-dimensional models 340 and 380 used to create the virtual representation.

The one or more virtual representations that have been generated in the virtual environment by the processing element are provided to a render element 114, 164 that renders the computer generated data of the one or more virtual representations for display by a display element 116, 166 to the local participant. The display element may be part of a head mounted display worn by the local participant or it may be any other suitable mechanisms for displaying the environment of the virtual location to the participant.

Important to maintaining the sense of actual presence or telepresence between two or more participants in the teleconference, the system has the ability to monitor or track any changes occurring with remote participants or the local participant. Any such changes will require that the virtual representation of the virtual environment and the other participants in it be changed accordingly. Thus, upon a change in the remote cued data received by a local receiver element, the perspective data collected from a local participant, or a change in the environment of the virtual location itself, will cause the one or more virtual representations of remote participants that are generated to be updated and the updated representations rendered and then displayed to the local participant.

Figure 2:
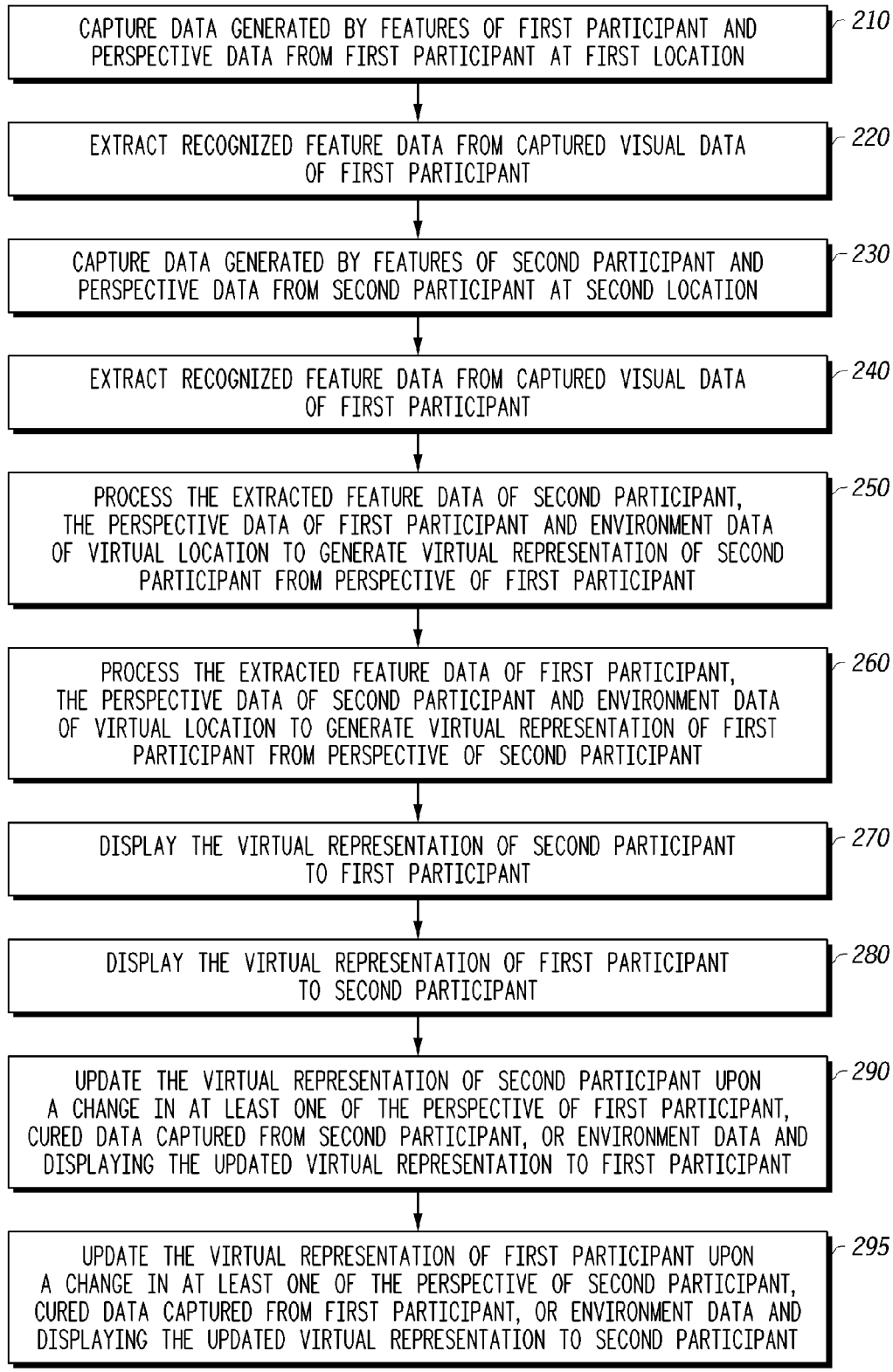
FIG. 2 is a flow describing virtual teleconferencing, in accordance with certain embodiments of the present invention.

Referring now to FIG. 2, a flow chart 200 which described a method of teleconferencing between at least two participants at a virtual location in accordance with certain embodiments of the present invention is shown. At block 210, data generated by the features of first participant 100 and perspective data of first participant 100 are captured. At Block 220, recognized patterns of the captured feature data of the first participant 100 are extracted. At Blocks 230 and 240, capturing of perspective data and cued data of the second participant 200 and extraction of recognized data is performed. At Block 250, the extracted feature data of the second participant, the perspective data of the first participant, and environment data of the virtual location are processed to generate a virtual representation of the second participant from the perspective of the first participant. At Block 260, similar processing occurs to generate a virtual representation of the first participant from the perspective of the second participant. These virtual representations may then be displayed to the appropriate participant at Blocks 270 and 280. As described above, the virtual representation is first rendered by a rendering element and the rendered virtual representation is displayed to the participant on an appropriate display means, such as a head mounted display. Finally, at Blocks 290 and 295, the generated virtual representations are updated upon a change in any of the data used to generate them. Thus, a change in the perspective data of the local participant, the cued data captured from the remote participant, or the environment will ensure that the virtual representation is updated accordingly. It is important to note, however, that since the cued remote data and the local perspective data are being monitored and tracked continuously, the virtual representations are being updated periodically anyway, such as 15 times or more per Second, for instance. However, a change in the data may force the update process to occur sooner than it might otherwise have occurred, contributing to the sense of a "real-time" in-person telepresence environment enjoyed by participants in the virtual teleconference.

It is noted here that while the capture, extraction and processing necessary to create the virtual representation of the second participant for display to the first participant occurs prior to similar processing to generate the virtual representation of the first participant for display to the second participant, the order may be changed if so desired without departing from the spirit and scope of the invention.

Figure 4:
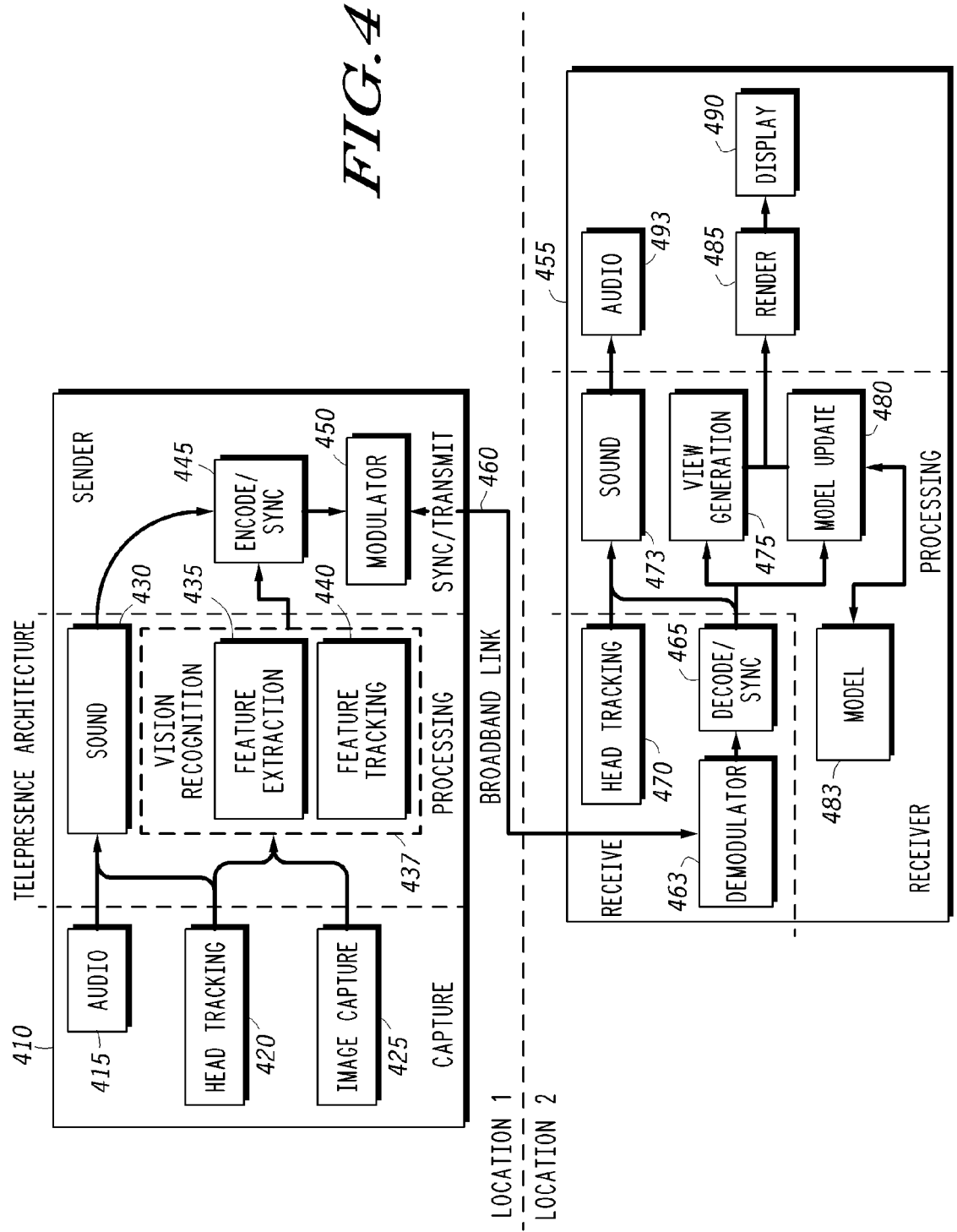
FIG. 4 is an exemplary, more detailed block diagram of system that supports virtual teleconferencing, in accordance with certain embodiments of the present invention.

Referring now to FIG. 4, a more detailed block diagram 400 of elements of telepresence communication architecture 400 is shown, in accordance with certain embodiments of the present invention. As indicated by the dashed line in the figure, the figure illustrates functionality involving data collected between first and second locations. As will be clear from the following description, the functionality concerns data collected, processed and transmitted by a sender block 410 at location 1 and data received, processed and displayed by a receiver block 455 at location 2. However, it will be understood that to make a completely integrated system there will need to be a receiver block and a sender block to support the participant at location 1 and the participant at location 2. The one-directional block diagram of FIG. 4 will simplify the description to follow and an extension to a fully bi- or multi-directional will be understood by those of skill in the art. It will be noted by one of ordinary skill in the art that a telepresence communication system is operable to transmit two images in full duplex using one or more communication links; while communication may occur over one or more broadband links, communication is not restricted to broadband. Thus, a remote location may comprise a sending module 410 as well as a receiving module 455. Also, a local location may comprise a sending module 410 and a receiving module 455. This configuration will allow two images to be tracked, transmitted, received and displayed. This is of course scalable to any number of locations and participants, subject to available processing power, storage, and latency conditions.

It can be seen by means of the dashed lines in the figure, that there are three main functions being performed by sender block 410 for the participant at Location 1: capture/tracking, processing, and synchronizing/transmitting. The sender block 410 is concerned primarily with the capture/tracking at Blocks 415, 420, 425, processing at blocks 430 and 437, and transmitting at Blocks 445, 450 of locally obtained participant information. At block 415, local audio, such as what the location 1 participant is saying is captured. Head tracking block 420 tracks movement and orientation of the location 1 participant and thus supplies the perspective data of participant 1. Image Capture block 425 captures feature data of location 1 participant, such as movement of participant 1's mouth, eyes, face, etc. In more sophisticated capture schemes, other features of the participant may be captured, such as movement of hands, arms, legs, etc. Blocks 415, 520, 425 are all examples of capture elements 104, 154. In certain embodiments of the present invention, audio element 415 is a microphone or boom microphone, head tracking element 420 is a head tracker, accelerator or some combination thereof. An MPEG-4 style facial animation player with local head tracking for a space-stable view may be used if desired. Image capture element 425 may be a number of cameras.

Figure 5:
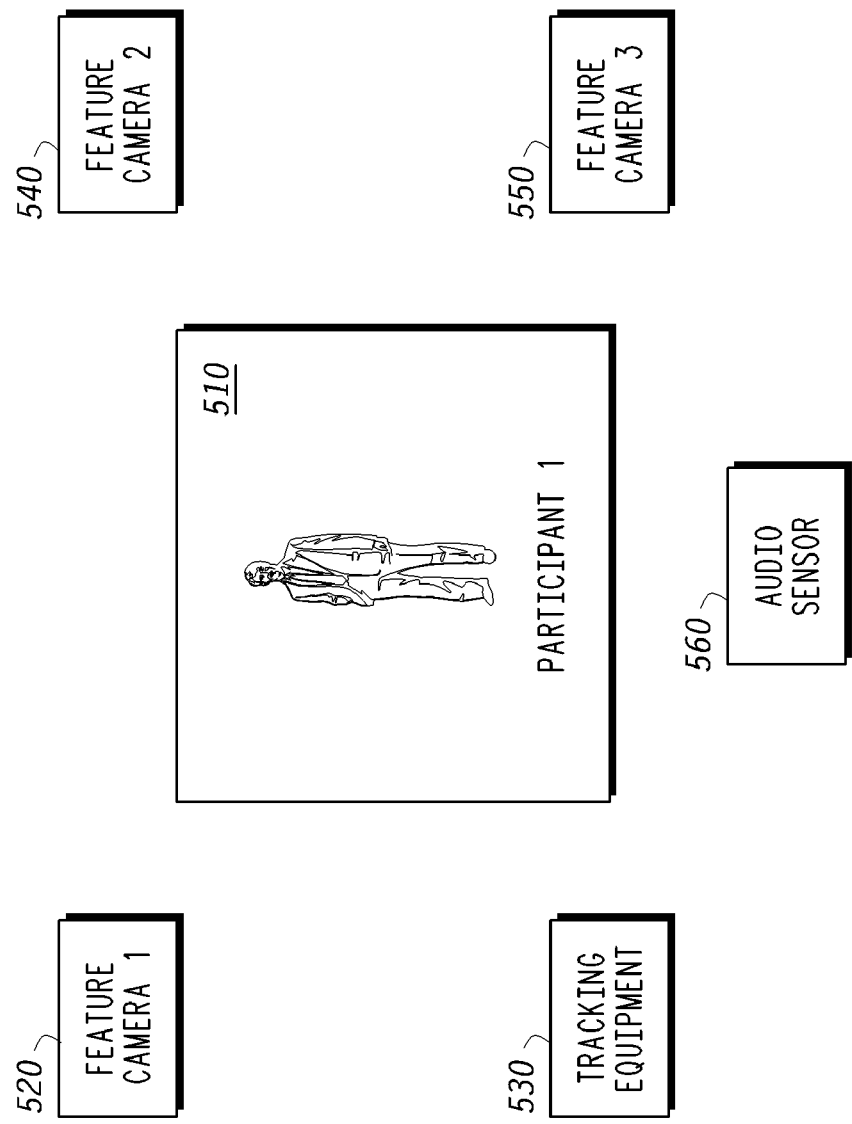
FIG. 5 illustrates various types of capture elements, in accordance with certain embodiments of the present invention.

FIG. 5 illustrates various types of capture elements suitable for capturing and tracking cued feature data and perspective data of a participant. In this figure, features of participant 510, such as eyes, mouth, face, hands, head etc. are captured by feature cameras 520, 550, and 550, while tracking equipment 530 is operable to track movement of these features. Audio sensor 560 captures audio generated by participant 510. Additionally, mouth movements may be tracked via audio analysis and embedded camera or cameras in a boom microphone if desired. According to an embodiment of the present invention, one or more of feature cameras 520, 540, 550, tracking equipment 530 and audio sensor 560 may be located in a head mounted display, such as an eyewear display. Also according to an embodiment of the present invention, a boom having one or more boom cameras and an audio sensor 560 may be coupled to the pair of eyeglasses. The one or more boom cameras are operable to provide more detailed resolution of the mouth and the region around the mouth. In a certain embodiment of the present invention, infrared illumination could be employed by eye cameras to compensate for lack of visual light.

Processing is performed on the audio information and the perspective data captured by head tracking element 420 to generate sound information about the location 1 participant that can be transmitted. Sound processing block 430 can modify the raw audio 415 produced by Participant 1 as a function of the head movement of Participant 1. Alternately, the raw audio captured at 415 may be simply transmitted if no locale processing is needed or desired. Computer vision recognition element 437 has feature extraction 435 and feature tracking 440 processing of the head tracking and cued feature data provided by elements 420 and 425. The most important feature data contained in the captured data is extracted and will be transmitted for processing by the receiver 455 at a remote location 2. Computer vision recognition subsystem 437, for instance, can extract and track movements of the head, mouth, pupils, eyelids, eyebrows, forehead, and other features of interest. In some cases, computer vision recognition element 437 may use a local 3D model of the participant itself for feature tracking.

In accordance with certain embodiments of the present invention, a sense of eye-to-eye contact may be achieved by providing, during a transmission set-up period, a first one or more fixed dots on the image displayed to a first user and a second one or more fixed dots on the image displayed to a second user. During the transmission set-up period, the location of the eyes in the image displayed to the first participant is collocated with the first one or more fixed dots. Also during the transmission set-up period, the location of the eyes in the image displayed to the second participant is collocated with the second one or more fixed dots. This approach enables the participants to have the sense of eye-to-eye contact since the first one or more fixed dots and the second one or more fixed dots provide the expected location of the eyes displayed to the first participant and the second participant, respectively. Eye contact is maintained by the participants responding to the visual cues presented to them, as in a real-life in-person conversation.

Extracted feature data from block 437 and processed sound from block 430 is encoded and synchronized at block 445. It is modulated at modulator 450 and then transmitted for receipt by demodulator 463 of the receiver block 455 associated with Location 2. In a certain embodiment of the present invention, this data is transmitted using a broadband link 460.

Data received from location 1 by demodulator 463 is demodulated and passed to a decoder 465. Decoder 465 passes decoded audio and extracted feature data of the participant at location 1 to sound element 473, view generation block 475 and model update block 480. Movement and orientation of participant 2, referred to as perspective data of participant 2, from head tracking element 470 and the audio data received from participant 1 are processed by sound block 473 to generate an audio component of a virtual representation of participant 1 from the perspective of participant 2 that can then be provided by audio element 493. Consider, for example, the following. The audio component of the virtual representation made available to participant 2 is affected not only by what participant 1 says, but also upon the orientation of participant 2's body or head with respect to participant 2 in the virtual environment.

In certain embodiments of the present invention, encoder 445 encodes spatial coordinated information that enables head tracking component 470 to create an aspect of the remote image that is space stabilized. Note that this space stabilization is operable to occur when one or more aspects captured by head tracking equipment 420 and image capture equipment 425 are coupled to a pair of eyeglasses. In this case, the use of head tracking 420 and feature tracking 440 allows the 3-D image generated to be stabilized with respect to movement of the head.

Extracted feature data is additionally made available to view generation block 475 and model update block 480 by decoder 465. It is used by model update 480 to update the model of the participant at location 1 that is stored at block 483. In certain embodiments, model update block 480 performs a facial model update that uses facial data stored in 3-D model 483 to construct the virtual representation of participant 1. View generation block 475 generates the view or views of the virtual representation of the participant 1 from the perspective of participant 2 to be rendered by render element 485 and then displayed to the participant at location 2 by display 490. In certain embodiments of the present invention, two slightly different views of the virtual representation of participant 1 in the virtual environment are generated by view generation element 475. When these slightly different views are rendered and then displayed to each eye at 485 and 490, respectively, they result in participant 2 experiencing a 3D stereoscopic view of participant 1.

Figure 6:
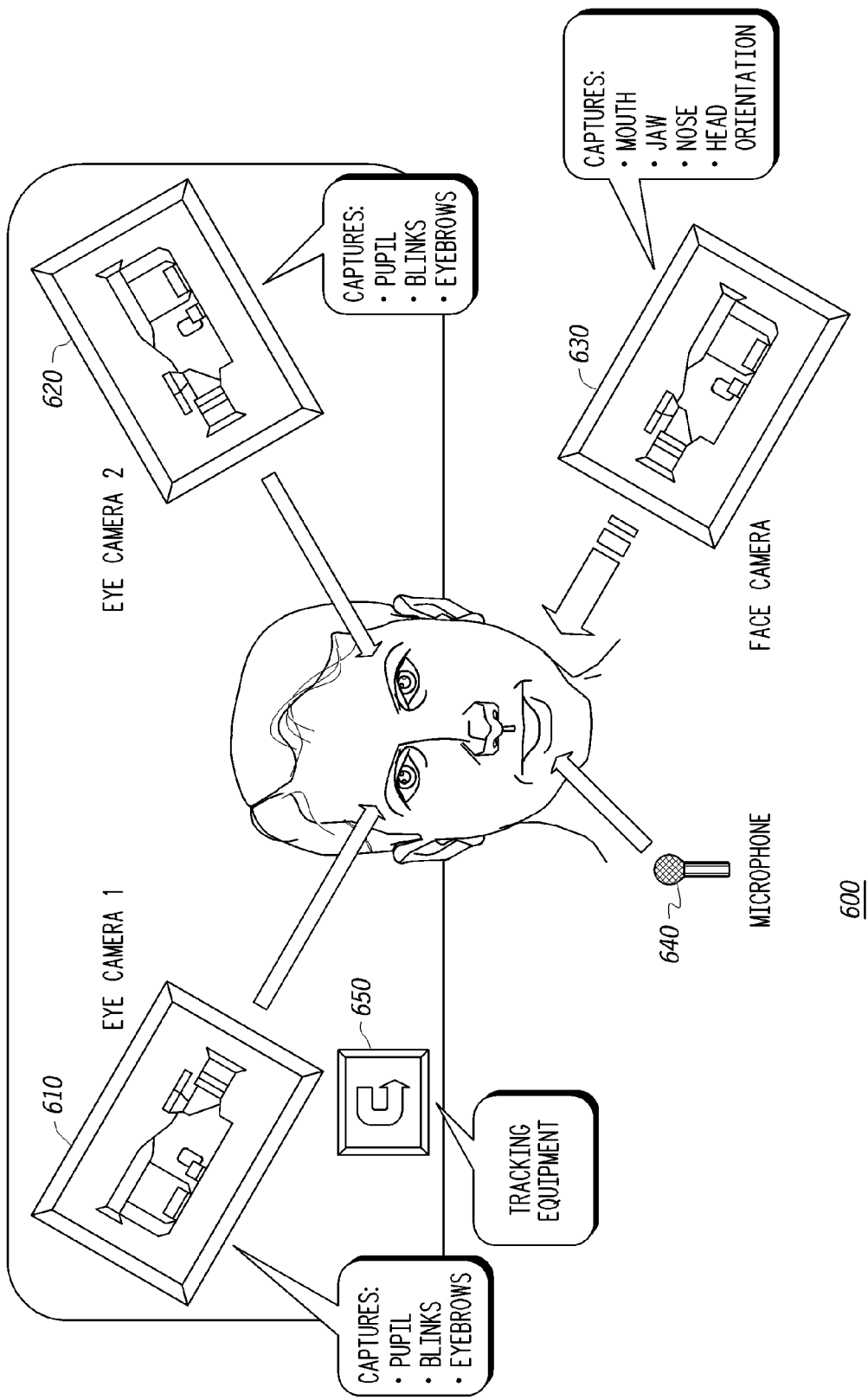
FIG. 6 illustrates an exemplary data capture system, in accordance with certain embodiments of the present invention.
Figure 7:
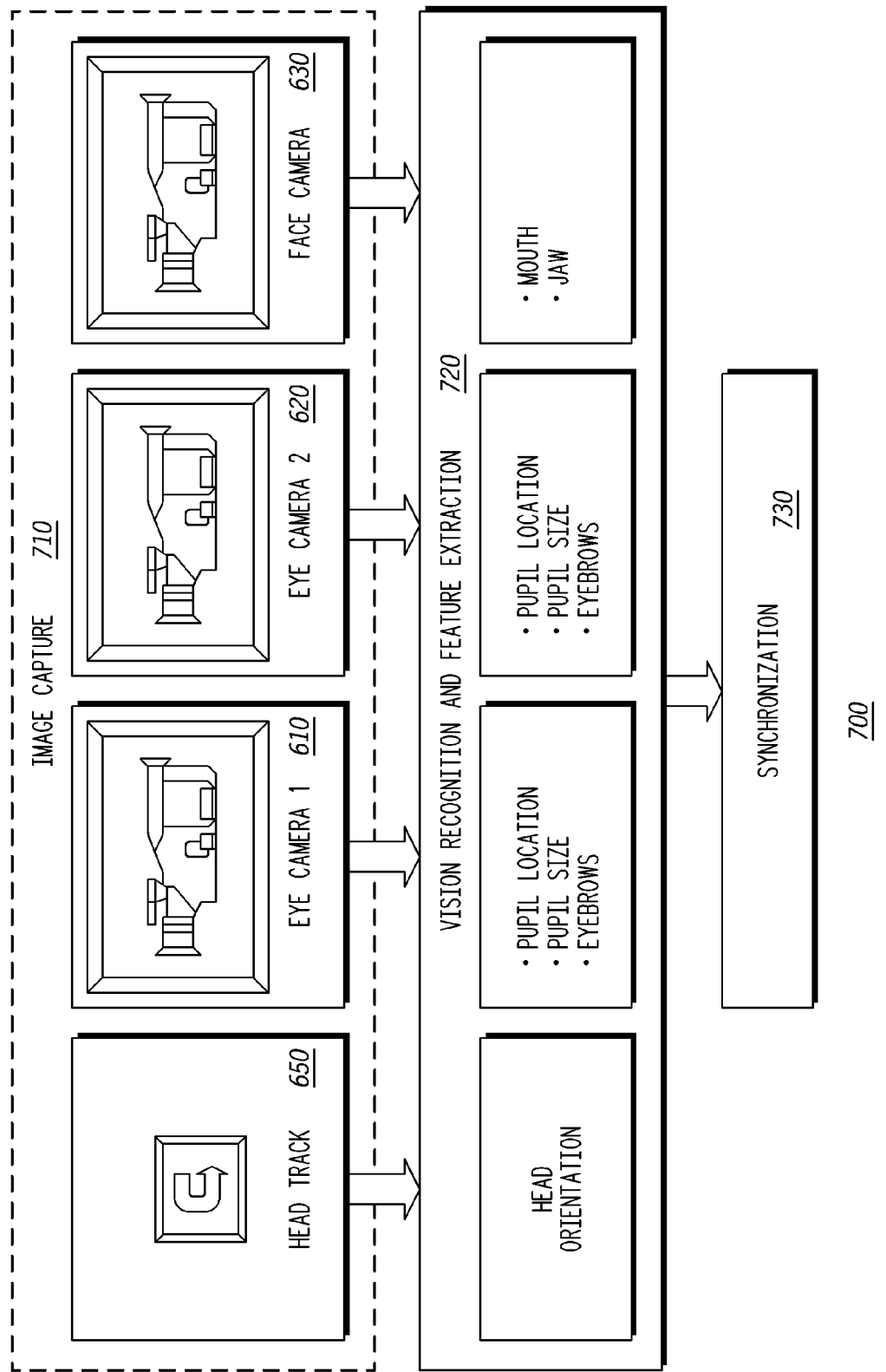
FIG. 7 illustrates an image capture flow, in accordance with certain embodiments of the present invention.
Figure 8:
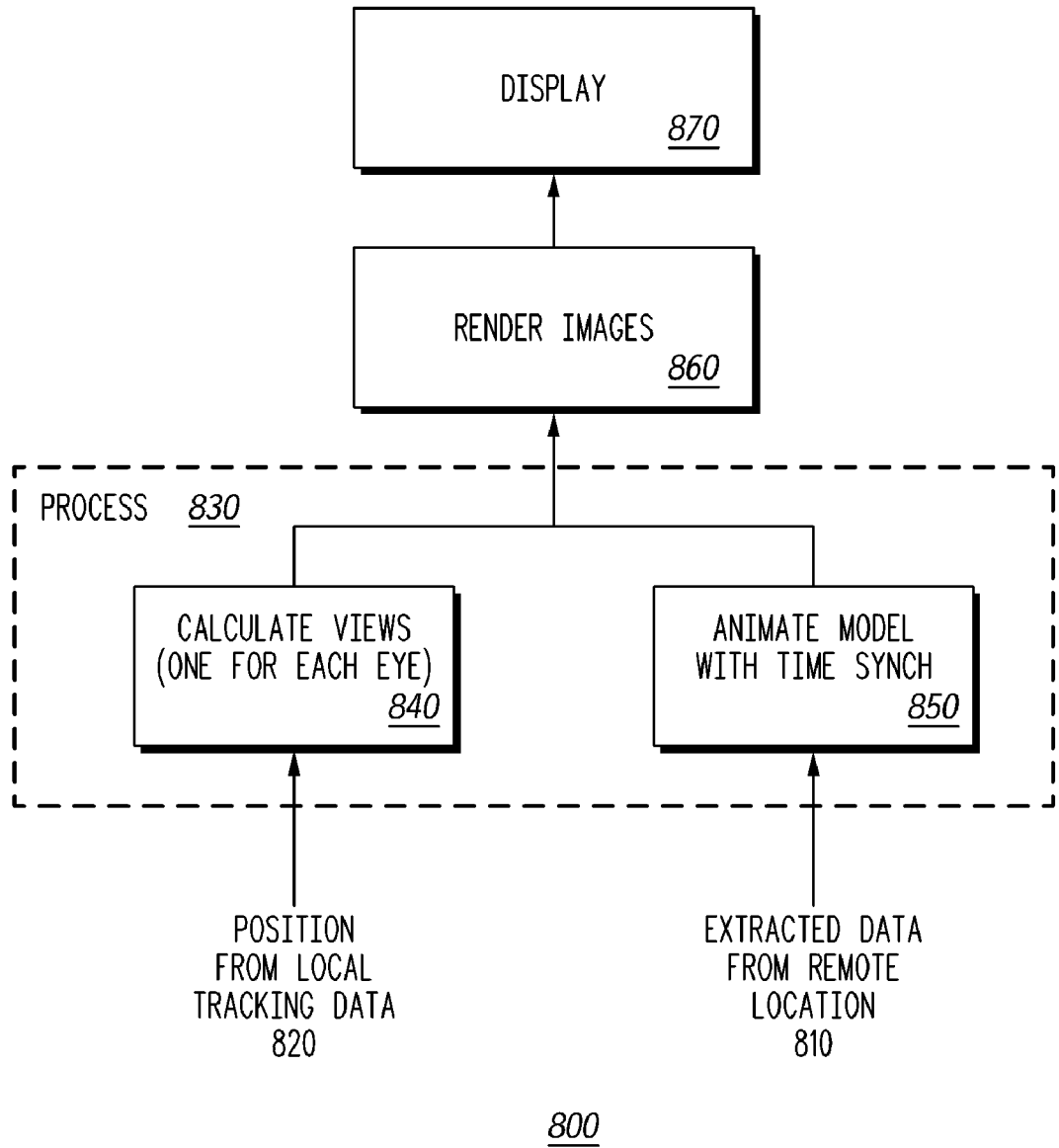
FIG. 8 illustrates an image generation and display flow, in accordance with certain embodiments of the present invention.

Referring now to FIG. 6, exemplary data capture system 600 is shown. The capture and tracking elements illustrated in this drawing include first and second eye cameras 610, 620, face camera 630, microphone for capturing sounds made by the participant, and tracking equipment 650. Eye cameras 610 and 620 capture the movement of various eyes features, including pupil movement, blinks, and eyebrow movement. Face camera 630 can capture movement of the mouth, jaw, node, and head orientation. Microphone 640 can additionally be a boom microphone having a camera that looks at the participant's mouth. Tracking equipment 650 tracks these features over time. In FIG. 7, image capture flow 700 illustrates how the data captured by capture elements 610, 620, 630, 650 of image capture block 710 is then processed by vision recognition and feature extraction processing at block 720 to extract certain valuable feature-cued data. At block 730, synchronization of this extracted feature data with a time or date stamp is performed prior to the data being transmitted for receipt by a receive block 455 associated with a remote location. FIG. 8 illustrates image generation and display flow 800, in which it is illustrated that views of the virtual representation by a participant at a remote location may be generated at Block 840, for one each eye for 3D stereoscopic viewing if desired, from local tracking data 820, referred to as perspective data herein. Extracted feature data from the remote location 810 is used to animate the stored model of the remote participant at Block 850. This information is then passed onto a rendering engine that renders computer images, which again may be stereo at Block 860; the rendered images may include audio information as described previously. Finally, at block 870, a display element, such as a display screen or a head mounted display, displays the rendered images to the local participant.

Referring now to FIG. 9, an example of a 3D model, as may be stored locally to aid in the generation of an avatar representative of a remote participant, is illustrated. On the left side of the model is the wireframe, the vertices of which are stored in memory and define the geometry of the face of the remote participant. On the right side, the texture map of the face, which shows such things as skin texture, eye color, etc., is overlaid the basic geometry of the wireframe as shown to provide a more real and compelling view of the remote participant. The updated movement, reflected in the captured feature data, is manifested in corresponding changes of the wireframe.

Figure 11:
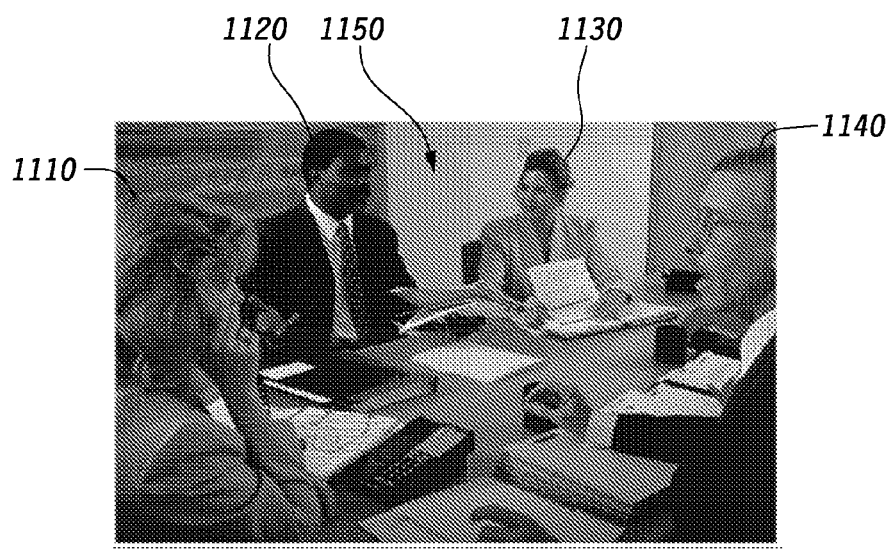
FIG. 11 illustrates a teleconference having multiple participants at a virtual location, in accordance with certain embodiments of the present invention.
Figure 12:
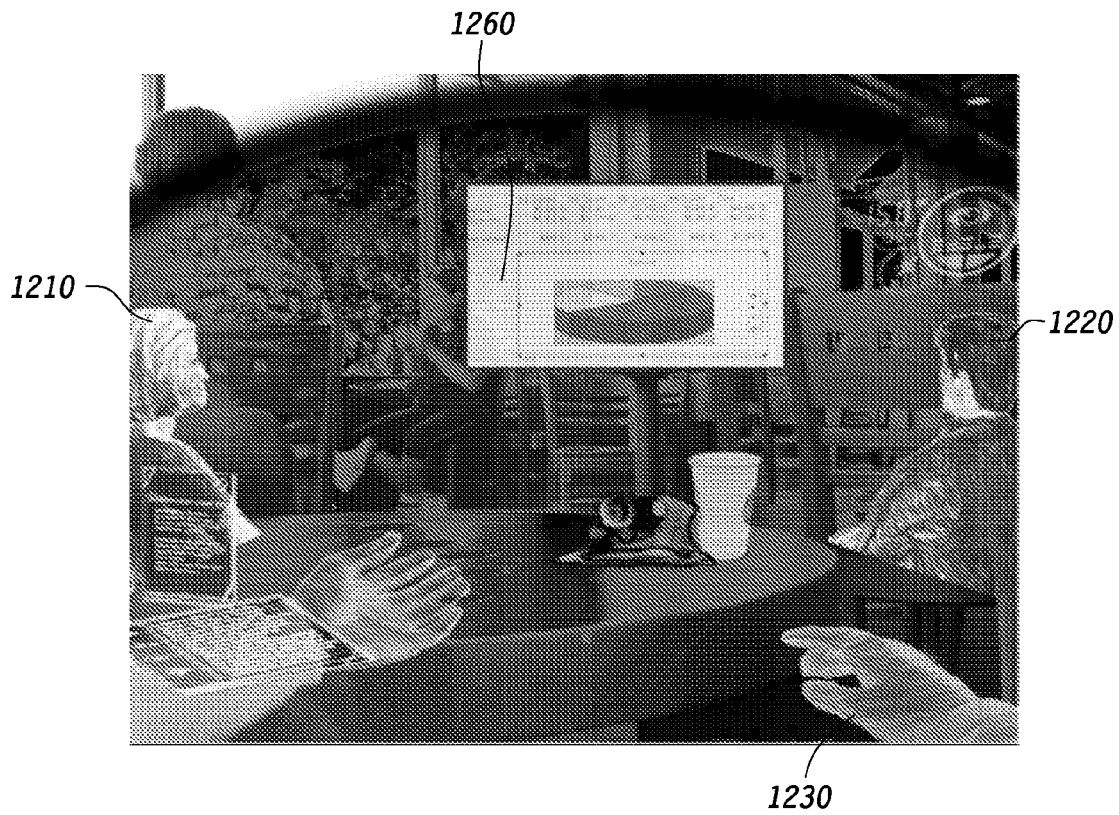
FIG. 12 illustrates a teleconference with shared objects and multiple participants, in accordance with certain embodiments of the present invention.

In FIG. 10, an illustration of a first participant at location 100, a second participant at location 200, and a virtual location 1000 is illustrated. In can be seen that, in this example, participants 1 and 2 at locations 100 and 200, respectively, are wearing head mounted displays through which they may both experience a virtual teleconference 1000 in which participant 1 1010 and participant 2 1020 both experience an mutual environment 1030 that is not real but which does make use of eye-to-eye contact and other telepresence features to greatly facilitate the virtual meeting. In this example, the environment 1030 is streamlined, having a conference table, a chair for each of the participants, and the participants themselves. It is also envisioned that the virtual environment may include the virtual representations of participants set against a real backdrop of the location where they are (location 1, location 2, etc.), such as in the middle of a library or conference room, etc. in which the viewing participant is actually located. As has been discussed, a teleconference according to the present invention is scalable to a number of participants. As shown in virtual teleconference 1100 of FIG. 11, this virtual teleconference 1100 is attended by at least four participants 1110, 1120, 1130, and 1140. The virtual environment 1150 in which the teleconference takes place is more elaborate. Also, as shown in this example and also in FIG. 12, may actually be better for a face-to-face traditional conference because it can facilitate the sharing of data during the teleconference by many participants are varying physical locations. In FIG. 12, participants 1210, 1220, and 1230 share an environment 1250 in which data or other objects presented during the virtual teleconference, such as view graph 1260, may be offered by a participant for viewing by one or more of the other teleconference participants. The ability to share data or other object information residing at a remote location with others not at that location via the virtual teleconference provides the advantage of being able to share a quality and quantity of information that would not ordinarily be available in a traditional teleconference. When there are more than two people in the teleconference, telepresence facilitates the exchange and observation of inter-personal communications that occur between multiple participants, such as shrugs, glances, etc. which commonly form an important, non-verbal aspect of any conversation. If there is a shared object, for instance, a participant can see that other participants in the teleconference have their attention directed to the shared object or that a participant is looking away from the object, etc., to reflect the full extent of communications that might occur in an actual meeting.

In accordance with another embodiment of the present invention, rather than capturing and tracking cued data generated by the monitored features of a participant, as was discussed above in connection with capture/tracking elements 104, 204, for instance, an audio and/or visual recording of captured feature data of the participant may be recorded by an capture element, which may have capture audio/visual (A/V) elements. The capture element may be a video camera focused on the participant, or other recording device, such as a cellular phone, microphone, etc. The capture element may be voice driven if desired. Tracking of the participant may be accomplished separately through a tracking element, as will be described herein, rather than through a combination capture/tracking element, i.e. capture/tracking elements 104, 204 as was described above. This audio and/or visual recording of the participant is processed by a processing element where it is encoded and then transmitted by a transmit/sync element to a receive element to be used for generating a video avatar of the participant.

Throughout the description of these further embodiments of the invention, several different types of data are described. The term user perspective modification data refers to data actively provided from the user via a user interface device or tracking element—e.g. keyboard or mouse—used to change the user's perspective in the space. The term feature data or captured feature data is data that has been passively captured from the user via a sensor or capture element, such as a camera, microphone, etc., as will be discussed at length, and may include, by way of example and not limitation, A/V feature data as will be described. The phrase encoded feature data is used to refer to the extracted feature data after is has been processed by an encoder—e.g. H.263. This data is used by the receiver and displayed on a model of the participant.

Figure 13:
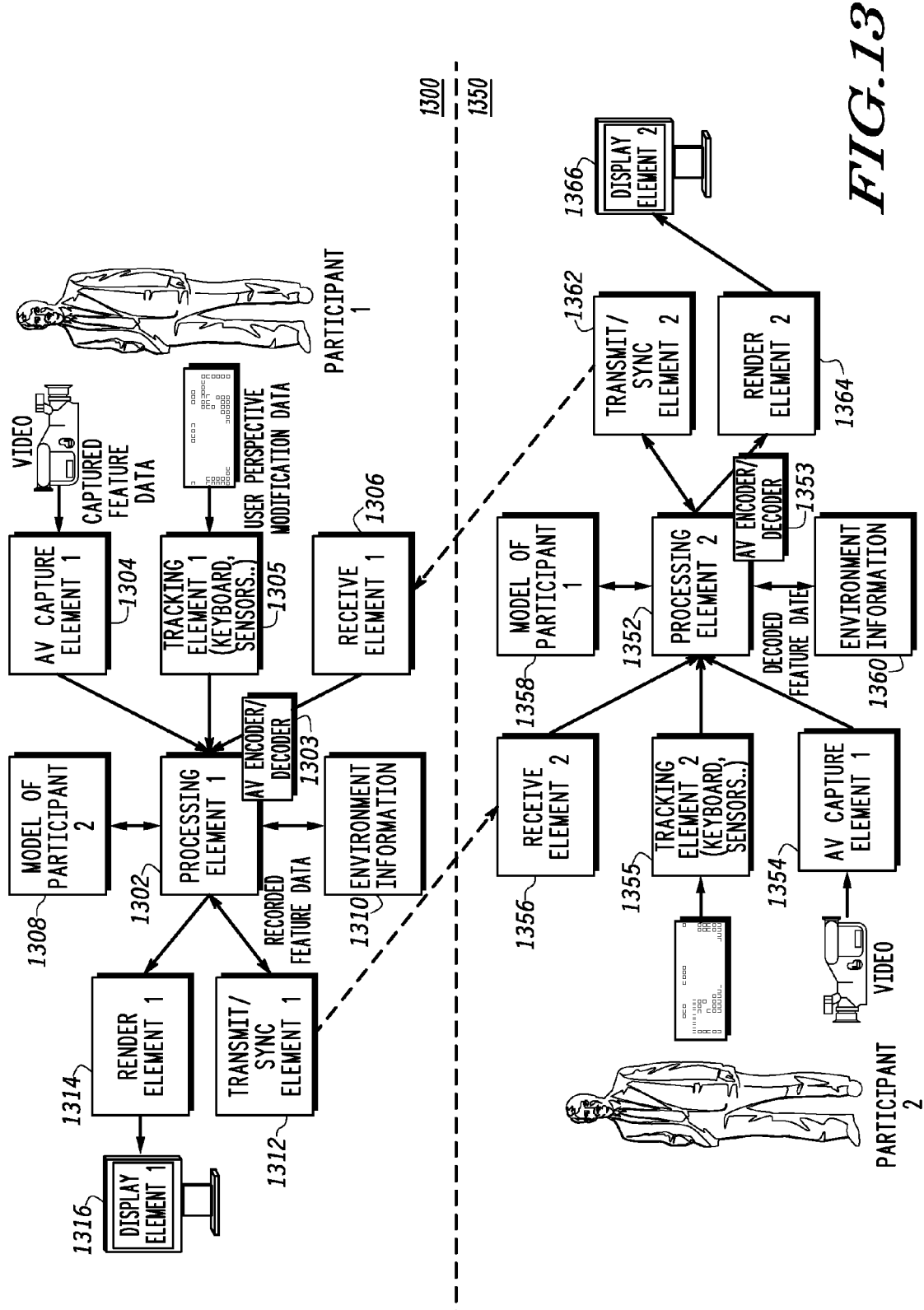
FIG. 13 is a block diagram of a system that supports virtual teleconferencing, in accordance with certain embodiments of the present invention.

Referring now to FIG. 13, a block diagram of a system that supports a virtual teleconference at a virtual location between a first participant at a first location 1300 and a second participant at a second location 1350 is shown. The system provides for the collection, processing and display of audiovisual information concerning one or more remotely located participants to a local participant in a manner that has telepresence, as will be described. The collection and processing of audiovisual information from both remote participants and a local participant, as well as interaction between remote and local participants and environment data of the virtual location, allows for the generation, updating and display of one or more virtual representations or avatars of remote participants in the environment of the virtual location of the teleconference to be made to the local participant, from the perspective of the local participant. As used herein, virtual representations or avatars may refer to either the video and/or the rendered representation of the user.

The telepresence teleconferencing of the present invention is scalable to any number of participants. The functionality shown in FIG. 13 may be employed for each participant beyond Participant 1 and Participant 2 that is added to the virtual teleconference, subject to available memory and latency requirements, with stored model information about the added participants made available to each of the other participants in the teleconference to facilitate the generation of virtual representations or avatars of all remote participants in the teleconference to any given local participant.

Referring again to the figure, capture element 1304, 1354, respectively, captures a recording of the participant on whom it is focused; the recording may be a streaming A/V format, an example of encoded feature data; otherwise, the recorded captured feature data may be processed by an encoder 1303 of processing element 1302 to generate encoded feature data suitable for transmission by transmit sync element 1 1312 to receive element 2 1356. Thus, capture element 1 1304, shown as a video camera focused on Participant 1, records a recording of captured feature data of Participant 1. This recording of the participant is sent to processing element 1302, which contains an encoder/decoder 1303, for processing and encoding (compression). Examples of video encoding standards for streaming A/V formats include H.263, H.264, MPEG-2, MPEG-4. Capture element 1304, 1354 is capable of recording an entire image including video and audio, just video or just audio. It may look at the whole person, not just portions of the body (eyes, head, eyebrows, etc) as is the case with the cued data discussed previously.

Unlike the system discussed previously in connection with FIG. 1, in this system embodiment capture element 1304, 1354 is not used for both capture and tracking, but rather for recording captured feature data of the participant, such as a video of the participant. This feature data is encoded by encoder/decoder element 1303, and the processed and encoded feature data, such as video, may then be transmitted by transmit/sync elements 1312 and 1362, respectively, to receiver elements 1306, 1356, respectively, at the receiving end. There the encoded feature data is supplied to processors 1352, 1302, respectively, associated with remote participants, where it will be processed, along with other data, such as environment information 1310, 1360, user perspective modification data provided by tracking elements 1305, 1355, respectively, for generating at render elements 1314, 1364 a video avatar of the participant in the virtual environment for viewing at display elements 1316, 1366 by one or more remote participants from the perspective of the remote participants.

The tracking of user perspective modification data from the participant is provided by tracking element 1305, 1355, respectively, illustrated here as a keyboard; the tracking element may be any element that allows the user to control and modify his own perspective within the virtual environment. The tracking element provides a means, other than that described previously with regard to capture/tracking element 104, 154, to track those movements of a participant within the virtual environment, such as the turning of the head or body, or other movement, that can be expected to alter the perspective of that participant in the teleconference. The tracking element, such as the keyboard shown here, provides a way for the participant to affect, i.e. control and modify, the perspective of his experience in the teleconference without the use of a heads-up display, previously discussed. The participant may manipulate his perspective in the virtual space by appropriate control and manipulation of his tracking element; in the example of a keyboard, this may be accomplished through manipulation of one or more keys and/or functions of the keyboard. For instance, the participant may simulate looking left in the virtual environment space by manipulating the left arrow key, while looking to the right in the space may be accomplished by use of the right arrow key. Other suitable tracking elements may include a sensor, joystick, mouse, PDA, stylus, a peripheral device, or another other technology capable of tracking the perspective of the participant, including the direction and/or orientation of movement of the body of the participant that can affect the perspective of the virtual environment that is experienced by the participant. As previously mentioned, tracking in this embodiment is not also performed by the capture element. The data used to update the perspective of the local and remote participant are referred to as the user perspective modification data, as has been described.

It is noted that user perspective modification data refers to any orientation or movement of the participant being monitored that may affect what is experienced by the participant in the virtual environment of the teleconference. User perspective modification data may thus include movement of the head or a re-orientation, such as turning, of the participant's body. For instance, if the virtual environment of the teleconference is to provide the sense that participants 1 and 2 are seated across from each other at a virtual conference table, then the acts of participant 1 moving his head, standing up, leaning forward towards participant 2 in the virtual environment, etc. may each be expected to change what is seen or heard by participant 1, as well as that experienced by participant 2, in the virtual environment, and thus the perspective experienced by participant 1 in the virtual environment is said to have changed. Thus, tracking movement, re-orientation, or other perspective data of a participant by the tracking element 1305, 1355 provides one of the types of data that is used to process and generate a believable teleconference at the virtual location for the participant.

The received encoded feature data, video in many cases, of one or more remote participants is decoded and rendered onto the representation of the remote participant(s) in the local scene. This decoded data is rendered with the appropriate context and orientation that is determined by the tracking elements and the environment. Data about the one or more participants at remote locations is additionally used to generate a virtual representation of the remote participants in the virtual environment from the perspective of a local participant. Receive elements 1306, 1356, functionally associated with participants 1 and 2, respectively, receive captured feature data captured from one or more remote participants, encoded by encoder/decoder element 1303, 1353, respectively, and transmitted over the system by remote transmit elements 1312, 1362 as described above. Thus, for the simplified system of FIG. 13, receive element1 1306 will receive from transmit element 1362 encoded A/V data processed and encoded by processing element2 1352 and encoder/decoder 1353 from the video recorded by capture element 1354 from Participant 2 and transmitted by transmit element2 1362. Similarly, receive element2 1356 will receive from transmit element1 1312 encoded data processed and encoded by processing element1 1302 and encoder/decoder1 1303 from the video recorded by capture element 1304 from Participant 1 and transmitted by transmit element1 1312. Again, the system of FIG. 13 is scalable, meaning there may be more than two participants, in which case the encoded feature data received by receive elements 1306, 1356 would be from more two or more remote participants.

With the receipt of the encoded recording by the receive element associated with a participant and the user perspective modification tracking data from the tracking element associated with that participant, the local processing element now has enough information to generate one or more virtual representations of the one or more remote participants in the virtual environment from the local participant's perspective. In addition to the captured feature data, such as video recording, of a remote participant that is processed and encoded to produce encoded feature data that is transmitted to and received by the local receive element, the processing element associated with the local participant has the perspective modification data provided by and captured from the local participant in response to user manipulation and control of a tracking element, a model of the remote participant, and information that is representative of the visual and audio configuration of the environment of the virtual location at which the virtual teleconference takes place. It should be noted that the user perspective modification tracking data need only be provided by the tracking element to the processing element upon some change in this data, as triggered by any changes to the tracking element exercised by the user. The processing element processes this information to generate a virtual representation of the remote participant in the virtual environment as seen from the perspective of the local participant. This processing may be performed by the processing element to generate virtual representations from the perspective of the local participant in the virtual environment for each remote participant that transmits its visual and/or audio information to the local receiver element.

Encoded, feature data, as in the streaming A/V format, for example, of the remote participant may be put together with a model of the remote participant (1308, 1358) that is stored and accessible to the processing element associated with the local participant. In this case, the received encoded feature data is combined with the stored model of the remote participant to render the avatar of the remote participant that is displayed to the local participant on display element 1316, 1366. The stored model may be a two-dimensional or three-dimensional (3D) computer model upon which the received A/V format data may be used to update or enhance the model. The model may additionally be just the head, bust or some larger model of the remote participant. It may be that only the head or face portion of the model is individual to the remote participant, with the rest of the virtual representation of the remote participant being supplied by a stock avatar not specific to the particular remote participant. The portion of the virtual representation of the remote participant that is individualized by the use of the participant-specific model 1308, 1358 may well be affected by factors such as the amount and quality of streaming A/V data that is collected and the amount of processing power and time to be dedicated to this task. If only eye, mouth, and face A/V data information are captured from the remote participant, then it would be sufficient to store only a participant-specific model of the head of the remote participant upon which the captured data may be overlaid, for example. An example of a 3D model is described in conjunction with FIG. 9, discussed above.

Information about the environment 1310, 1360 of the virtual location where the teleconference is to take place is also processed by the local processing element 1302, 1352 when generating the virtual representation of a remote participant. Environment data expresses the set-up of the virtual conference, with the relative positions of each of the participants within it and the visual backdrop, such as the location of a conference table, windows, furniture, etc. to be experienced by the participants while in the teleconference. Movement of a participant, by either head or body movement, or as reflected by tracking elements 1305, 1355, by one or more teleconference participants may change the perspective from which the participant sees this environment and so must be tracked and accounted for when generating the virtual representation of the remote participant that will be displayed to the local participant. Again, the processing element that generates the virtual representation for the local participant may be operable to generate virtual representations in this manner for each participant in the virtual teleconference for which A/V data is received.

Figure 15:
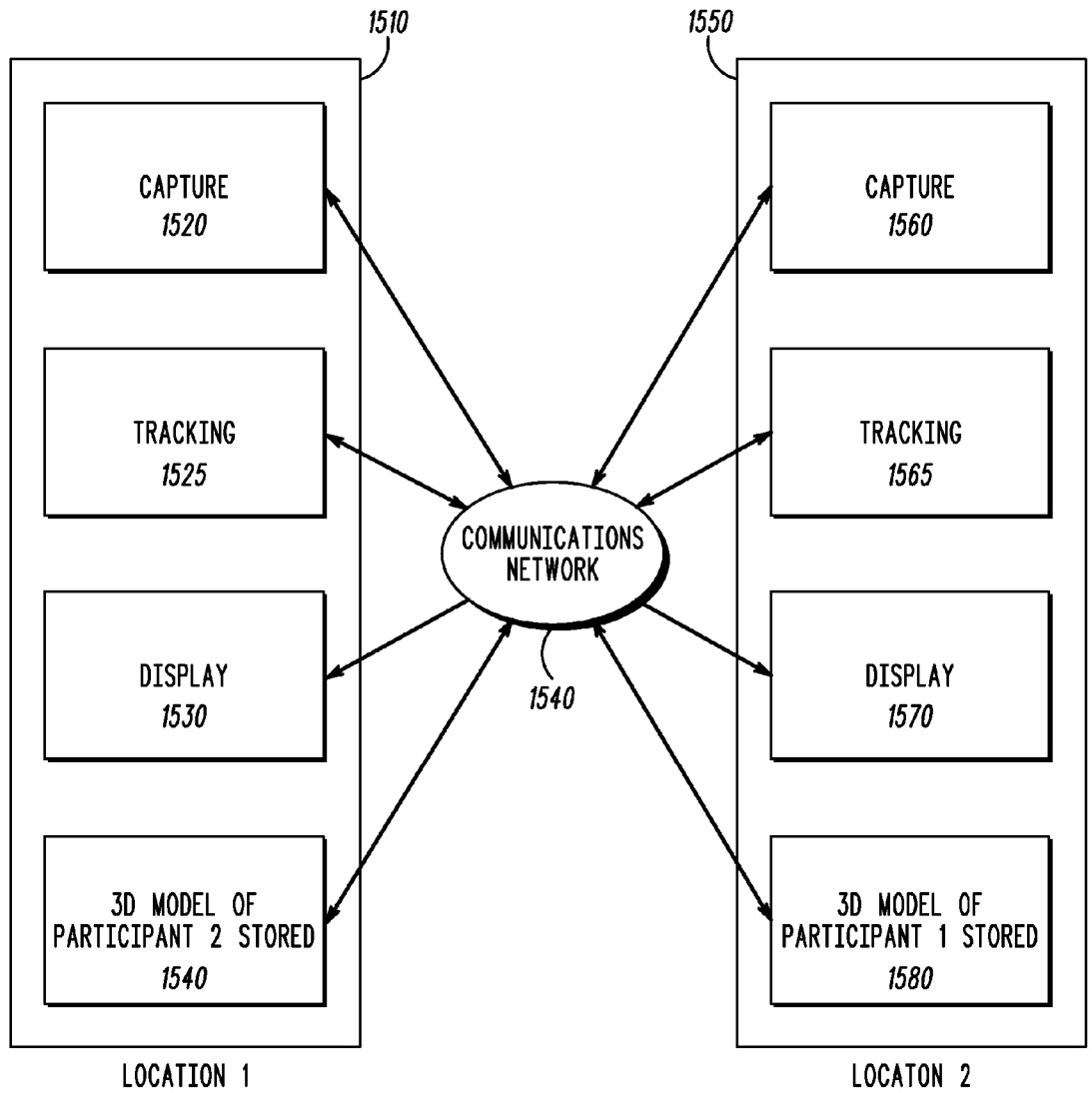
FIG. 15 is a block diagram of virtual teleconferencing, in accordance with certain embodiments of the present invention.

The processing elements 1 and 2, shown as elements 1302, 1303 and 1352, 1353, respectively, need not necessarily reside at the participants' locations. Additionally, they need not necessarily be one discrete processor and may indeed encompass many processing elements to perform the various processing functions as will be described. It is further envisioned that there may be a central processing element, which may encompass both processing element1 1302, 1303 and processing element2 1352, 1353 and which may further be physically located in a location different from locations 1300 and 1350. This is illustrated in block diagram 1500 of FIG. 15. The processing of captured local A/V and perspective data and remote data need not be performed at local locations, such as Location 1 and Location 2, and may indeed be provided by processing capabilities of communication network 1590. The captured data of participants 1 and 2 are transmitted remotely using communications network 1590. In a certain embodiment of the present invention, communications network 1590 is a high bandwidth, low latency communications network. For instance, data may be communicated at 20 fps with a 150 mS latency over a standard Internet IP link. Also, while communication may occur over one or more broadband links, communication is not restricted to broadband.

Models of remote participants 1540, 1580 are shown at local locations 1, 2, respectively, but this is not required, particularly as the processing element or elements are to be located on the communication network; the stored model may be a 3D computer model as shown. 3D models are useful to store image information that does not rapidly change, and thereby allows the amount of data that must be transmitted across communications network 1590 to be reduced. After receiving remote image data, data display components 1530 and 1560 are operable to update the 3-dimensional models 1540 and 1580 used to create the virtual representation made available to the local participant.

The one or more virtual representations that have been generated in the virtual environment by the processing element are provided to a render element 1314, 1364 that renders the computer generated data of the one or more virtual representations for display by a display element 1316, 1366 to the local participant. As previously described, the display element may be a monitor, computer screen, or the like, or it may be any other suitable mechanisms for displaying the environment of the virtual location to the participant. In this embodiment, the display element as a computer screen, monitor or the like, provides the benefits of telepresence without the requirement of using a heads-up display in the telepresence system.

Important to maintaining the sense of actual presence or telepresence between two or more participants in the teleconference, the system has the ability to monitor or track any changes occurring with remote participants or the local participant. Any such changes will require that the virtual representation of the virtual environment and the other participants in it be changed accordingly. As described in connection with this embodiment, either or both of the local participant and the remote participant may control at any time the perspective viewed by them by manipulation of their respective tracking elements, such as through manipulation of their keyboard, stylus, joystick, mouse, peripheral device or other suitable device. This user perspective modification data, then, is data that in addition to captured feature data, model information and environment data is used to update the avatar of remote participants as seen by a local participant. Thus, upon a change in at least one of the A/V encoded feature data of a remote participant received by a local receiver element, the user perspective modification data collected from a local participant, the user perspective modification data collected from the remote participant, or a change in the environment of the virtual location itself, the one or more virtual representations of remote participant(s) that are generated are updated and the updated representations rendered and then displayed to the local participant.

Figure 14:
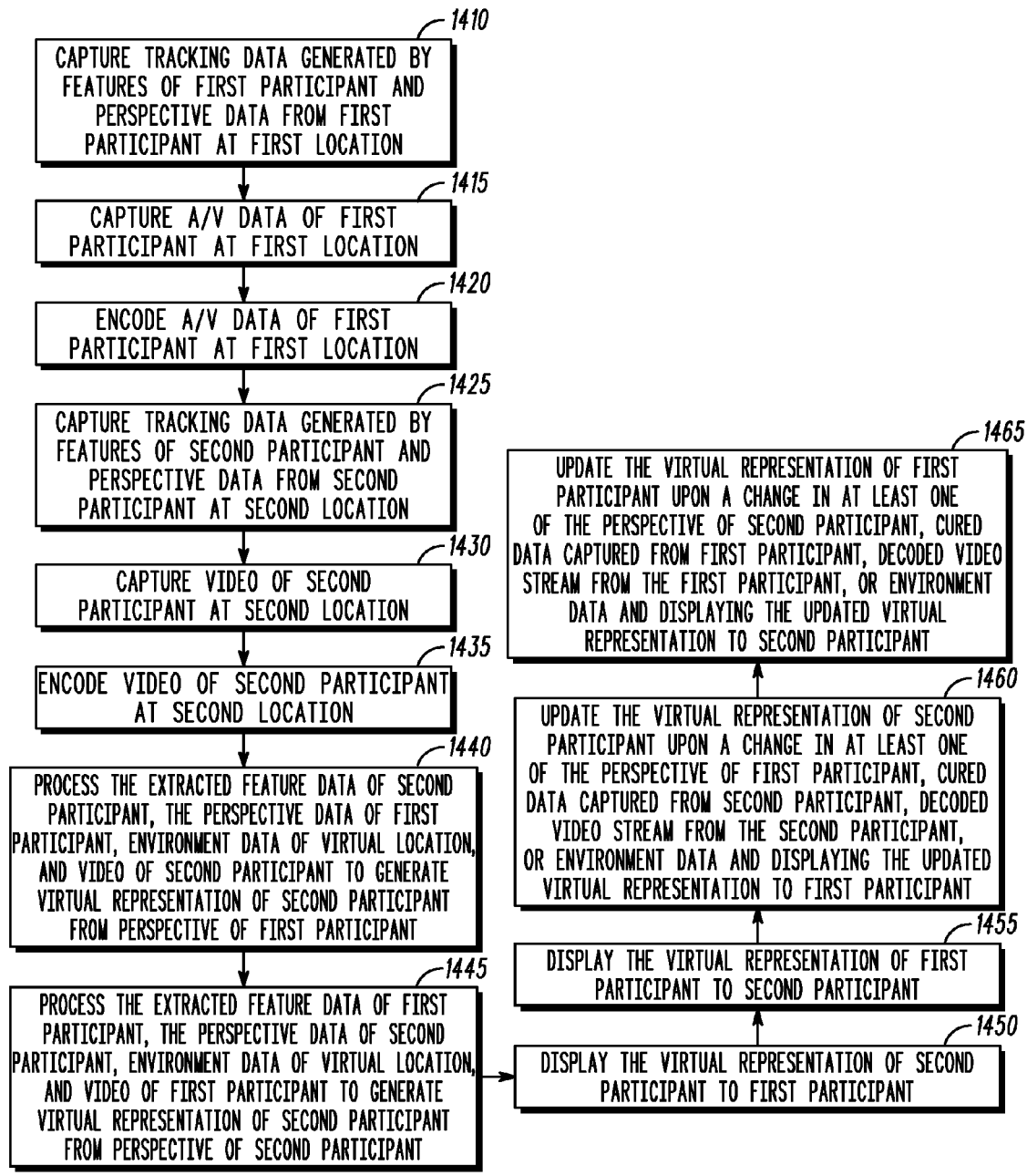
FIG. 14 is a flow describing virtual teleconferencing, in accordance with certain embodiments of the present invention.

Referring now to FIG. 14, flow chart 1400 describes an exemplary method of teleconferencing between at least two participants at a virtual location in accordance with these certain embodiments of the present invention. At block 1410, user perspective modification data generated by the first participant at first location 1300 are captured by tracking element 1305. At Block 1415, the feature data, such as streaming A/V, i.e. video, of the first participant at the first location is captured by capture element 1304 as discussed above. This feature data of the first participant at the first location is encoded at Block 1420. Next, at Block 1425, the user perspective modification data generated by the second participant at the second location 1350 are captured by tracking element 1355. At Block 1430, the feature data, such as video, of the second participant at second location 1350 is captured by capture element 1354 per the discussion above. This feature data is encoded at Block 1435. Next, at Block 1440, the encoded feature data, such as encoded A/V feature data, from the second participant (received from transmit element 1362), the perspective data of the first participant, and the environment data 1310 of the virtual location is processed by processing element 1302 and encoder/decoder 1303 to generate the virtual representation of the second participant from the perspective of the first participant. This is performed with the encoded feature data from the first participant (received from transmit element 1312), the perspective data of the second participant, and the environment data 1360 with the appropriate processing elements 1352, 1353, to generate the virtual representation of the first participant from the perspective of the second participant at Block 1445. These virtual representations may then be displayed to the appropriate participant at Blocks 1450 and 1455. As described above, the virtual representation is first rendered by a rendering element and the rendered virtual representation is displayed to the participant on an appropriate display means, such as a computer monitor or screen.

Finally, at Blocks 1460 and 1465, the generated virtual representations are updated upon a change in any of the data used to generate them. Thus, a change in the user perspective modification data of the local participant, the encoded feature data captured from the remote participant, or the environment information will ensure that the virtual representation is updated accordingly. At Block 1465, for instance, the virtual representation of the first participant is updated upon the occurrence of a change in condition, which may be brought about upon the occurrence of several different conditions, including upon a change in at least one of the user perspective modification tracking data of the first participant, the feature data of the second participant, and environment data of the virtual location. Any updated virtual representation is displayed to the second participant. At Block 1460, a similar analysis occurs, but in this instance for displaying an updated virtual representation(s) of the second participant to the first participant.

It is to be noted that in addition to the three types of data processed to generate or update a virtual representation of a participant, another, fourth type of data may also be used— the user modification perspective data of the remote participant. Consider, for example, a change in the user perspective modification data of the second participant, such as through control and manipulation of a keyboard by the second participant. This change, which may reflect a change in where the second participant is looking in the virtual space, for instance, can be expected to affect the virtual representation of the second participant that is displayed to the first participant. The converse, i.e. that a change in the user perspective modification data of the first participant may cause the virtual representation of the first participant that is displayed to the second participant to change, may also be true.

It is noted here that while the capture, tracking and processing necessary to create the virtual representation of the second participant for display to the first participant occurs prior to similar processing to generate the virtual representation of the first participant for display to the second participant, the order may be changed if so desired without departing from the spirit and scope of the invention.

Figure 16:
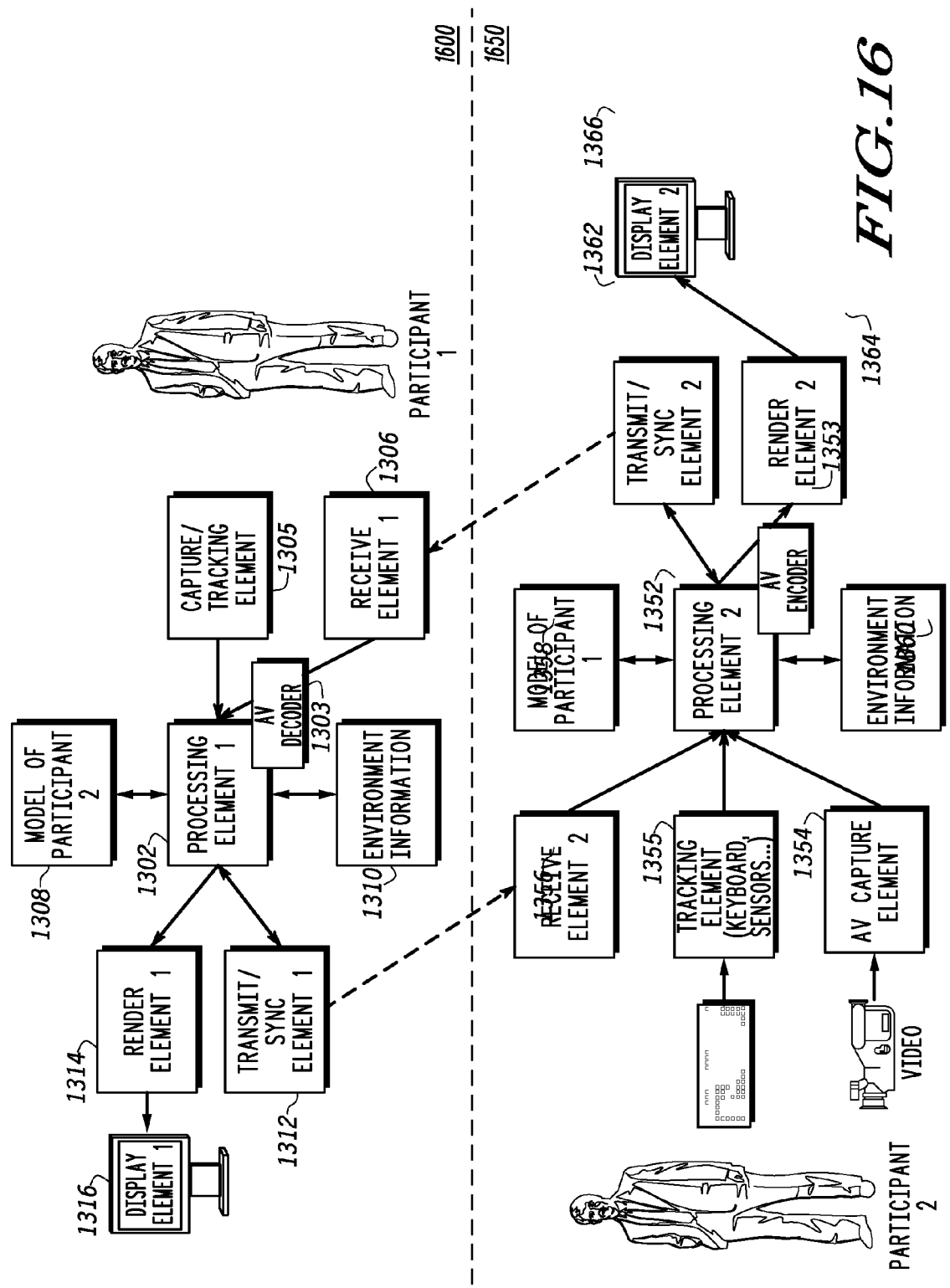
FIG. 16 is a block diagram of a combinational system that supports virtual teleconferencing, in accordance with certain embodiments of the present invention.

Referring now to FIG. 16, it can be seen that a so-called combinational approach may be employed in connection with certain other embodiments of the present invention. In this figure, in connection with Participant 1 there is a system 1600 that is consistent with the principals described for FIGS. 1-4 above. System 1600 communicates with System 1650, which is consistent with the principals described for FIGS. 13-15 above. One point of interest, however, is that because processing element 1 in system 1600 must process, i.e. decode, feature data captured by the capture element of system 1650, transmitted by transmit element 2, and received by receive element 1, the processing element 1 is in communication with an decoder block as shown. Conversely, processing element 2 operates with encoder, as shown, in order to be able to encode the feature data captured by the video stream of participant 2 at Location 2.

Thus, using the combinational approach shown in FIG. 16, participant 1 may be interfacing with the virtual teleconference by means of a heads-up display, while participant 2 is being recorded by the capture element and can control his respective user perspective within the virtual environment by manipulation of a keyboard, joystick, PDA, stylus, sensor or other tracking element.

Figure 17:
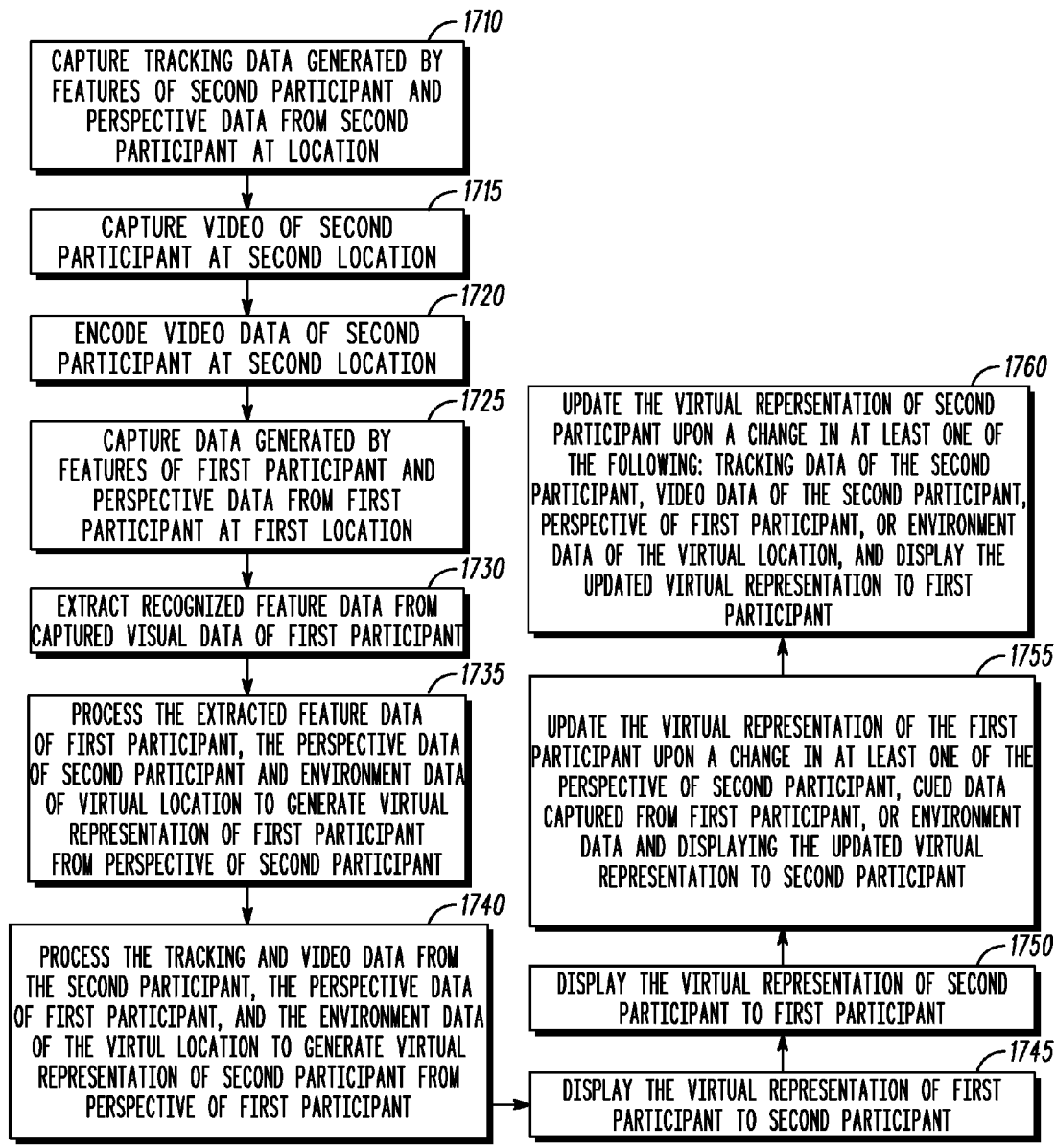
FIG. 17 is a flow describing virtual teleconferencing for the combinational system of FIG. 16, in accordance with certain embodiments of the present invention.

Moreover, with regard to the combination system approach, reference to the flowchart 1700 of FIG. 17 illustrates a combinational method of teleconferencing between at least two participants at a virtual location in accordance with certain embodiments of the present invention. Blocks 1725, 1730, 1735, 1755 relate to the approach discussed in connection with FIGS. 1-4 while Blocks 1710, 1715, 1720, 1740, and 1760 relate to FIGS. 13-15.

At block 1710, user perspective modification data generated by the second participant at second location are captured by tracking element. At Block 1715, the feature data, such as streaming A/V, i.e. video, of the second participant at the second location is captured by capture element as discussed above. This feature data of the second participant at the second location is encoded at Block 1720. At Block 1725, data generated by features of the first participant and perspective data from the first participant at the first location are captured. Recognizable feature data and patterns are extracted from the captured visual data of the second participant at Block 1730. Blocks 1725 and 1730 are performed in accordance with the description related to FIG. 2 above, for example. It is noted that the order in which Blocks 1710-1720 and 1725-1730 may be reversed or changed without departing from the spirit and scope of the claimed invention.

Next at blocks 1735 and 1740 virtual representations of the first and second participants, respectively, are generated. It is noted that in this combinational approach of FIGS. 16 and 17, the data used to generate or modify the virtual representations of the participants differs. As previously mentioned, Participant 1's feature and perspective data is captured and managed in accordance with the description of FIGS. 1-4 while that of Participant 2 is more described by FIG. 14, for example.

At Block 1735, a virtual representation of the first participant from the perspective of the second participant is generated. The extracted feature data of the first participant, the perspective data of the second participant and environment data of the virtual location are processed by the second processing element associated with the second participant at the second location to generate the virtual representation of the first participant from the perspective of the second participant. At Block 1740, the first processing element and the decoder associated with the first participant operate to process the encoded feature data from the second participant, the perspective data of the first participant, and the environment data of the virtual location to generate the virtual representation of the second participant from the perspective of the first participant. At Blocks 1745 and 1750, these virtual representations may be displayed. In the case of Participant 1, this may be via a heads-up display as other types of displayed as has been previously described. In the embodiment described in connection with Participant 2, in which a heads-up display is not used by Participant 2, the representation of participant 1 may be displayed to Participant 2 by means of a computer screen, monitor or other suitable display. It is understood that the order in which the processing of blocks 1735 and 1740 occurs is not necessarily important and may vary or such processing may occur simultaneously, particularly as the processing elements associated with each participant may be distinct.

Blocks 1755 and 1760 illustrate that the virtual representations of the participants may be updated and the updated representations displayed to the respective participants. Again, the order in which this updating and displaying occurs may vary and may occur simultaneously, particularly as the processing elements associated with each participant may be distinct. At Block 1755, the virtual representation of the first participant is updated and the updated virtual representation displayed to the second participant upon a change in one or more of the following conditions: the user perspective modification data of the second participant, cued data captured from the first participant, and/or the environment data of the virtual location. At block 1760, the virtual representation of the second participant is updated and the updated virtual representation displayed to the first participant upon a change in one or more of the following conditions: the user perspective modification data of the second participant, encoded feature data captured from the second participant, the perspective data of the first participant, and/or the environment data of the virtual location.

Next, at Block 1440, the encoded feature data from the second participant (received from transmit element 1362), the perspective data of the first participant, and the environment data 1310 of the virtual location is processed by processing element 1302 and encoder/decoder 1303 to generate the virtual representation of the second participant from the perspective of the first participant. This is performed with the encoded feature data from the first participant (received from transmit element 1312), the perspective data of the second participant, and the environment data 1360 with the appropriate processing elements 1352, 1353, to generate the virtual representation of the first participant from the perspective of the second participant at Block 1445. These virtual representations may then be displayed to the appropriate participant at Blocks 1450 and 1455. As described above, the virtual representation is first rendered by a rendering element and the rendered virtual representation is displayed to the participant on an appropriate display means, such as a computer monitor or screen.

Finally, at Blocks 1460 and 1465, the generated virtual representations are updated upon a change in any of the data used to generate them. Thus, a change in the user perspective modification data of the local participant, the encoded feature data captured from the remote participant, or the environment information will ensure that the virtual representation is updated accordingly. At Block 1465, for instance, the virtual representation of the first participant is updated upon the occurrence of a change in condition, which may be brought about upon the occurrence of several different conditions, including upon a change in at least one of the user perspective modification data of the first participant, the feature data of the second participant, and environment data of the virtual location. Moreover, the user perspective modification data of the second participant can likewise result in the virtual representation of the first participant being updated. Any updated virtual representation is displayed to the second participant. At Block 1460, a similar analysis occurs, but in this instance for displaying an updated virtual representation(s) of the second participant to the first participant.

It is noted here that while the capture, tracking and processing necessary to create the virtual representation of the second participant for display to the first participant occurs prior to similar processing to generate the virtual representation of the first participant for display to the second participant, the order may be changed if so desired without departing from the spirit and scope of the invention.

Figure 18:
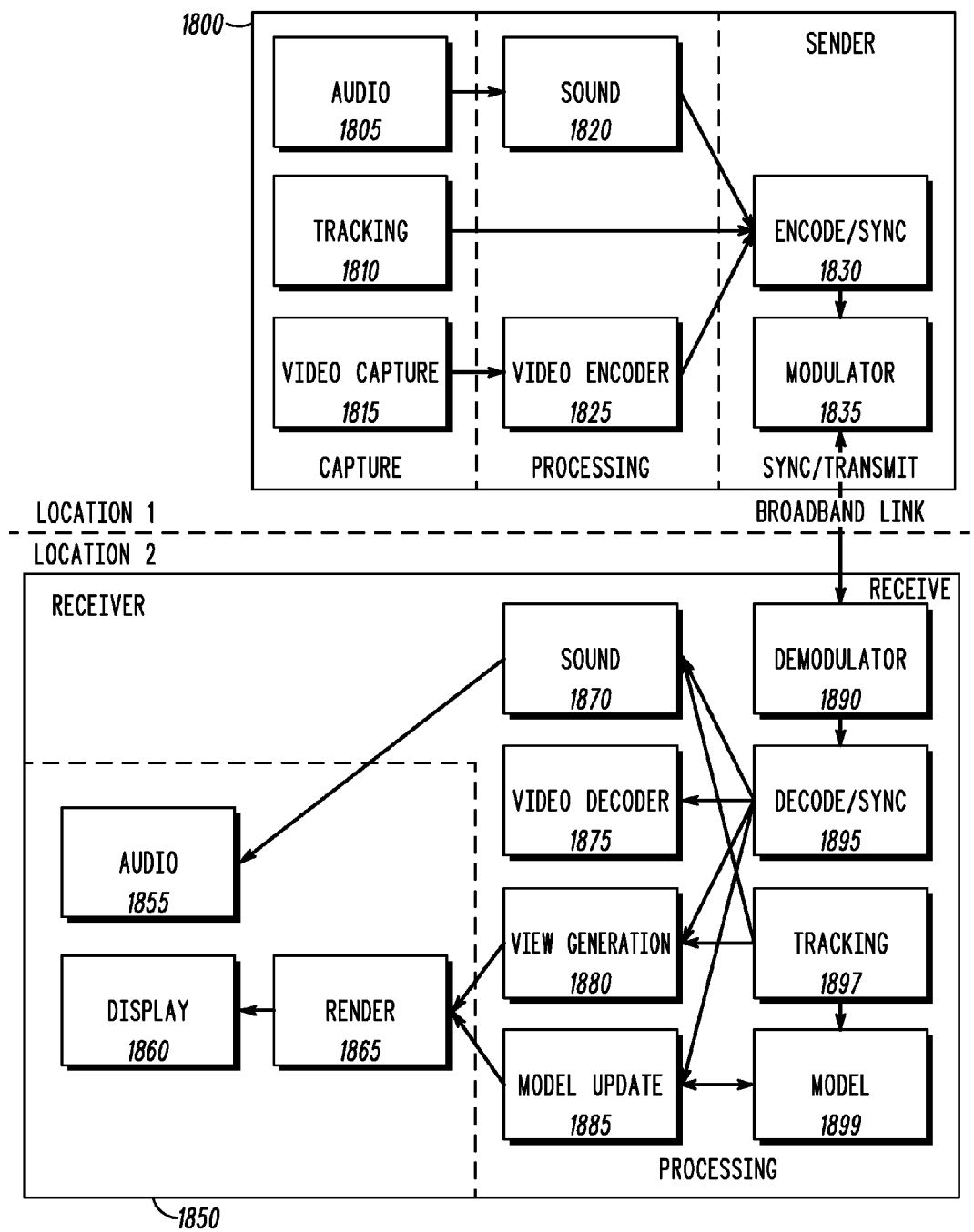
FIG. 18 is an exemplary, more detailed block diagram of system that supports virtual teleconferencing, in accordance with certain embodiments of the present invention.

In FIG. 18, a more detailed block diagram 1800 of elements of telepresence communication architecture is shown, in accordance with certain embodiments of the present invention. This architecture is illustrative for the approach in which the capture element and the tracking element are separate, as discussed in connection with FIGS. 13-17. As indicated by the dashed line in the figure, the figure illustrates functionality involving data collected between first and second locations.

Referring now to FIG. 18, a more detailed block diagram of elements of telepresence communication architecture is shown, in accordance with certain embodiments of the present invention presented in FIGS. 13-17. As indicated by the dashed line in the figure, the figure illustrates functionality related to data transmitted and/or received (collected) between first and second locations. As will be clear from the following description, the functionality concerns data collected, processed and transmitted by a sender block 1800 at location 1 and data received, processed and displayed by a receiver block 1850 at location 2. However, it will be understood that to make a completely integrated system there will need to be a receiver block and a sender block to support the participant at location 1 and the participant at location 2. The one-directional block diagram of FIG. 18 will simplify the description to follow and an extension to a fully bi- or multi-directional will be understood by those of skill in the art. It will be noted by one of ordinary skill in the art that a telepresence communication system is operable to transmit two images in full duplex using one or more communication links; while communication may occur over one or more broadband links, communication is not restricted to broadband. Thus, a remote location may comprise a sending module 1800 as well as a receiving module 1850. Also, a local location may comprise a sending module 1800 and a receiving module 1850. This configuration will allow two images or virtual representations to be tracked, transmitted, received and displayed. This is of course scalable to any number of locations and participants, subject to available processing power, storage, and latency conditions.

It can be seen by means of the dashed lines in the figure, that there are three main functions being performed by sender block 1800 for the participant at Location 1: capture and tracking, processing, and synchronizing/transmitting. The sender block 1800 is concerned primarily with video capture at Block 1815, tracking at Block 1810 and audio capture at Block 1805, processing of sound at Block 1820 and A/V at video encoder 1825, and with the synchronization/transmit function at encoding/synchronization Block 1830 and modulator block 1835 locally obtained participant information. It should be noted that unlike the telepresence architecture described in connection with FIG. 4, the capture element and the tracking element are separate functional elements, thereby permitting the use of a key board or other suitable device to enable the user to easily control his perspective within the virtual environment, as reflected in the user perspective modification data.

At block 180, local audio, such as what the location 1 participant is saying is captured; video capture occurs at Block 1815. The audio and video capture functions of 1805 and 1815 may be performed by the same device. As discussed at length above, the capture element may be a videocamera or other suitable device or means for capturing the A/V information data of the participant. In this embodiment, tracking of the perspective of Participant 1 is performed by a separate function, shown as tracking block 1810. As discussed above, the participant can readily control the perspective experienced within the virtual environment through manipulation of a tracking element, such as a keyboard, etc., as reflected in his user perspective modification data captured by tracking element 1810. The processing of the A/V data occurs within processing blocks 1820 and 1825. At Blocks 1830 and 1835 the A/V and tracking data is encoded if necessary and synchronized, and modulated, in readiness of transmission of the data to a receiver 1850 at location 2. It is modulated at modulator 1835 and then transmitted for receipt by demodulator 1890 of the receiver block 1850 associated with Location 2. In a certain embodiment of the present invention, this data is transmitted using a broadband link.

In accordance with certain embodiments of the present invention, a sense of eye-to-eye contact may be achieved by providing, during a transmission set-up period, a first one or more fixed dots on the image displayed to a first user and a second one or more fixed dots on the image displayed to a second user. During the transmission set-up period, the location of the eyes in the image displayed to the first participant is collocated with the first one or more fixed dots. Also during the transmission set-up period, the location of the eyes in the image displayed to the second participant is collocated with the second one or more fixed dots. This approach enables the participants to have the sense of eye-to-eye contact since the first one or more fixed dots and the second one or more fixed dots provide the expected location of the eyes displayed to the first participant and the second participant, respectively. Eye contact is maintained by the participants responding to the visual cues presented to them, as in a real-life in-person conversation.

Data received from location 1 by demodulator 1890 is demodulated and passed to a decoder 1895. Decoder 1895 passes decoded audio and feature data of the participant at location 1 to sound element 1870, video decoder 1875, view generation block 1880 and model update block 1885. Movement and orientation of participant 2, referred to as their user perspective modification data, from tracking element 1897 and the A/V data and tracking data (user perspective modification data of participant 1) received from participant 1 are processed by sound block 1870 to generate an audio component of a virtual representation of participant 1 from the perspective of participant 2 that can then be provided by audio element 1855. Consider, for example, the following. The audio component of the virtual representation made available to participant 2 is affected not only by what participant 1 says, but also upon the orientation of participant 2's body or head with respect to participant 2 in the virtual environment.

Encoded feature data is additionally made available to view generation block 1880 and model update block 1885 by decoder 1895. It is used by model update 1885 to update the model of the participant at location 1 that is stored at block 1899. In certain embodiments, model update block 1885 performs a facial model update that uses facial data stored in 3-D model 1899 to construct the virtual representation of participant 1. View generation block 1880 generates the view or views of the virtual representation of the participant 1 from the perspective of participant 2 to be rendered by render element 1865 and then displayed to the participant at location 2 by display 1860.

Telepresence telecommunications is a novel approach designed to provide a sense of presence of the person or persons with whom the communication is taking place. It is an alternative to traditional video conferencing systems that may use three-dimensional graphical avatars and animation enhancements to deliver the experience of a face-to-face conversation. Other communication methods like letter writing, telephone, email or video teleconferencing do not provide the same experience as an in-person meeting. In short, the sense of presence is absent. A telepresence teleconference attempts to deliver the experience of being in physical proximity with the other person or persons or objects with which communication is taking place.

Telepresence architecture employs an audio-visual communication system that is operable to transmit to one or more remote users a local image's likeness in three dimensions, potentially in full scale and in full color. Telepresence communication is also operable to remotely make and maintain eye contact. Mechanisms that contribute to the sense of presence with a remote person are the provision for a high resolution display for one or more specified regions of an image, the ability to track participant movements within one or more specified regions of an image, and the ability to update changes in local and/or remote participant changes in near real-time. The telepresence architecture enables one or more participants to receive likeness information and render the information as a three-dimensional image from the perspective of the local participant to a display unit, providing proper tracking and refresh rates.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method of teleconferencing in an environment of a virtual location between a first participant at a first location and a second participant at a second location, comprising:

processing a first plurality of user perspective modification data of a first perspective of the environment of the virtual location experienced by the first participant and a first encoded feature data from the second participant to generate a first virtual representation of the second participant in the environment of the virtual location from the perspective of the first participant;

processing a second plurality of user perspective modification data of a second perspective of an environment of the virtual location experienced by the second participant and a second encoded feature data from the first participant to generate a second virtual representation of the first participant in the environment of the virtual location from the perspective of the second participant;

displaying the first virtual representation of the second participant in the virtual location of the teleconference to the first participant at the first location; and displaying the second virtual representation of the first participant in the virtual location of the teleconference to the second participant at the second location.

2. The method of claim 1, further comprising:

capturing the first plurality of user perspective modification data by a first tracking element under control of the first participant; and capturing the second plurality of user perspective modification data by a second tracking element under control of the second participant.

3. The method of claim 1, further comprising:

updating the first virtual representation of the second participant upon a change in one or more of the first plurality of user perspective modification data and the first encoded feature data to generate an updated first virtual representation;

displaying the updated first virtual representation of the second participant in the virtual location of the teleconference to the first participant at the first location;

updating the second virtual representation of the second participant upon a change in one or more of the second plurality of user perspective modification data and the second encoded feature data to generate an updated second virtual representation; and displaying the updated second virtual representation of the first participant in the virtual location of the teleconference to the second participant at the first location.

4. The method of claim 3, further comprising:

updating the first virtual representation of the second participant upon a change in the second plurality of user perspective modification data; and updating the second virtual representation of the first participant upon a change in the first plurality of user perspective modification data.

5. A method of teleconferencing in an environment of a virtual location between a first participant at a first location and a second participant at a second location, comprising:

processing a first plurality of perspective data of a first perspective of the environment of the virtual location experienced by the first participant and a first encoded feature data from the second participant to generate a first virtual representation of the second participant in the environment of the virtual location from the perspective of the first participant;

processing a first plurality of user perspective modification data of a second perspective of an environment of the virtual location experienced by the second participant and a first extracted feature data extracted from a first plurality of cued data captured from the first participant to generate a second virtual representation of the first participant in the environment of the virtual location from the perspective of the second participant;

displaying the first virtual representation of the second participant in the virtual location of the teleconference to the first participant at the first location; and displaying the second virtual representation of the first participant in the virtual location of the teleconference to the second participant at the second location.

6. The method of claim 5, further comprising:

updating the first virtual representation of the second participant upon a change in one or more of the first plurality of perspective data of the first perspective and the first encoded feature data to generate an updated first virtual representation;

displaying the updated first virtual representation of the second participant in the virtual location of the teleconference to the first participant at the first location;

updating the second virtual representation of the first participant upon a change in one or more of the first plurality of user perspective modification data of the second perspective and the first extracted feature data extracted from the first plurality of cued data captured from the first participant to generate an updated second virtual representation; and displaying the updated second virtual representation of the first participant in the virtual location of the teleconference to the second participant at the first location.

7. The method of claim 5, wherein displaying the first virtual representation of the second participant to the first participant in the first location further comprises:

displaying the first virtual representation of the second participant to the first participant on a first head mounted display worn by the first participant.

8. A method of teleconferencing in an environment of a virtual location between a first participant at a first location and a second participant at a second location, comprising:

capturing a first plurality of feature data from the first participant and a first plurality of user perspective modification data of a first perspective of an environment of the virtual location experienced by the first participant;

capturing a second plurality of feature data from the second participant and a second plurality of user perspective modification data of a second perspective of the environment of the virtual location experienced by the second participant;

encoding the first plurality of feature data from the first participant to generate a first plurality of encoded feature data;

encoding the second plurality of feature data from the second participant to generate a second plurality of encoded feature data;

processing the first plurality of user perspective modification data, the second plurality of encoded feature data, and a first environment data of the environment of the virtual location to generate a first virtual representation of the second participant in the environment of the virtual location from the perspective of the first participant;

processing the second plurality of user perspective modification data, the first plurality of encoded feature data, and a second environment data of the environment of the virtual location to generate a second virtual representation of the first participant in the environment of the virtual location from the perspective of the second participant;

displaying the first virtual representation of the second participant in the virtual location of the teleconference to the first participant at the first location; and displaying the second virtual representation of the first participant in the virtual location of the teleconference to the second participant at the second location.

9. The method of claim 8, further comprising:

capturing the first plurality of user perspective modification data by a first tracking element under control of the first participant; and capturing the second plurality of user perspective modification data by a second tracking element under control of the second participant.

10. The method of claim 8, further comprising:

updating the first virtual representation of the second participant upon a change in one or more of the first plurality of user perspective modification data, the second plurality of encoded feature data and the first environment data to generate an updated first virtual representation;

displaying the updated first virtual representation of the second participant in the virtual location of the teleconference to the first participant at the first location;

updating the second virtual representation of the first participant upon a change in one or more of the second plurality of user perspective modification data, the first plurality of encoded feature data and the second environment data to generate an updated second virtual representation; and displaying the updated second virtual representation of the first participant in the virtual location of the teleconference to the second participant at the first location.

11. The system of claim 10, further comprising:

updating the first virtual representation of the second participant upon a change in the second plurality of user perspective modification data; and updating the second virtual representation of the first participant upon a change in the first plurality of user perspective modification data.

12. The method of claim 8, wherein capturing the first and second plurality of feature data and the first and second plurality of user perspective modification data, respectively, occurs in real time.

13. A method of teleconferencing in an environment of a virtual location between a first participant at a first location and a second participant at a second location, comprising:

capturing a first plurality of cued data generated by a plurality of features of the first participant and a first plurality of perspective data of a first perspective of the environment of the virtual location experienced by the first participant;

capturing a first plurality of feature data from the second participant and a first plurality of user perspective modification data of a second perspective of the environment of the virtual location experienced by the second participant;

extracting a first extracted feature data of the first participant from the first plurality of cued data;

encoding the first plurality of feature data from the second participant to generate a first plurality of encoded feature data;

processing the first plurality of perspective data of the first participant, the first plurality of encoded feature data of the second participant, and a first environment data of the environment of the virtual location to generate a first virtual representation of the second participant in the environment of the virtual location from the perspective of the first participant;

processing the first plurality of user perspective modification data of the second participant, the first extracted feature data of the first participant, and a second environment data of the environment of the virtual location to generate a second virtual representation of the first participant in the environment of the virtual location from the perspective of the second participant;

displaying the first virtual representation of the second participant in the virtual location of the teleconference to the first participant at the first location; and displaying the second virtual representation of the first participant in the virtual location of the teleconference to the second participant at the second location.

14. The method of claim 13, further comprising:
updating the first virtual representation of the second participant upon a change in one or more of the first plurality of perspective data of the first perspective, the first encoded feature data, and the first environment data to generate an updated first virtual representation;
displaying the updated first virtual representation of the second participant in the virtual location of the teleconference to the first participant at the first location;
updating the second virtual representation of the first participant upon a change in one or more of the first plurality of user perspective modification data of the second participant, the first extracted feature data extracted the first participant, and the second environment data to generate an updated second virtual representation; and
displaying the updated second virtual representation of the first participant in the virtual location of the teleconference to the second participant at the first location.

15. The method of claim 13, wherein displaying the first virtual representation of the second participant to the first participant in the first location further comprises:
displaying the first virtual representation of the second participant to the first participant on a first head mounted display worn by the first participant.

16. A system that supports a teleconference in an environment of a virtual location between a first participant at a first location and a second participant at a second location, comprising:
a first processing element, comprising a first encoder/decoder element, that processes a first plurality of feature data captured from the first participant to generate first encoded feature data of the first participant;
a first tracking element operable to capture first user perspective modification data of the first participant that reflects a first perspective of the environment of the virtual location experienced by the first participant;
a first transmit element that transmits the first encoded feature data and the first user perspective modification data of the first participant;
a second processing element, comprising a second encoder/decoder element, that processes a second plurality of feature data captured from the second participant to generate second encoded feature data of the second participant;
a second tracking element operable to capture second user perspective modification data of the second participant that reflects to a second perspective of the environment of the virtual location experienced by the second participant;
a second transmit element that transmits the second encoded feature data and the second user perspective modification data of the second participant;
wherein the first processing element processes the first user perspective modification data, the second encoded feature data, and a first environment data of the environment of the virtual location to generate a first virtual representation of the second participant in the environment of the virtual location from the perspective of the first participant;
wherein the second processing element processes the second user perspective modification data, the first encoded feature data, and a second environment data of the environment of the virtual location to generate a second virtual representation of the first participant in the environment of the virtual location from the perspective of the second participant;
a first display element that displays the first virtual representation to the first participant at the first location; and
a second display element that displays the second virtual representation to the second participant at the second location.

17. The system of claim 16, wherein the first processing element updates the first virtual representation of the second participant upon a change in one or more of the first user perspective modification data, the second encoded feature data and the first environment data, and
wherein the second processing element updates the second virtual representation of the first participant upon a change in one or more of the second user perspective modification data, the first encoded feature data and the second environment data.

18. The system of claim 17, further comprising wherein the first processing element updates the first virtual representation of the second participant upon a change in the second user perspective modification data and wherein the second processing element updates the second virtual representation of the first participant upon a change in the first user perspective modification data.

19. The system of claim 16, wherein the first tracking element is operable to capture the first user perspective modification data of the first participant under control of the first participant and wherein the second tracking element is operable to capture the second user perspective modification data of the second participant under control of the second participant.

20. The system of claim 19, wherein the first processing element, the first transmit element, and the first display element are coupled to the first location and the second processing element, the second transmit element, and the second display element are coupled to the second location.

21. The system of claim 16, further comprising:
a first capture element that captures the first plurality of feature data from the first participant;
a second capture element that captures the second plurality of feature data from the second participant.

22. The system of claim 16, further comprising:
a first receive element operable to receive the second plurality of user perspective modification data and the second encoded feature data of the second participant transmitted by the second transmit element; and
a second receive element operable to receive the first plurality of perspective data and the first encoded feature data of the first participant transmitted by the first transmit element.

23. The system of claim 16, further comprising:
a first rendering element coupled to the first processing element and the first display element that renders the first virtual representation of the second participant for display by the first display element; and
a second rendering element coupled to the second processing element and the second display element that renders the second virtual representation of the first participant for display by the second display element.

24. A system that supports a teleconference in an environment of a virtual location between a first participant at a first location and a second participant at a second location, comprising:
a first processing element that processes a plurality of cued data captured from a plurality of features of the first participant and extracts selected feature data recognized from the first plurality of cued data to generate extracted feature data of the first participant;
a first transmit element that transmits the extracted feature data of the first participant;
a second processing element, comprising an encoder/decoder element, that processes a first plurality of feature data captured from the second participant to generate encoded feature data of the second participant;
a tracking element operable to capture user perspective modification data of the second participant that reflects a second perspective of the environment of the virtual location experienced by the second participant;
a second transmit element that transmits the encoded feature data of the second participant;
wherein the first processing element processes a first plurality of perspective data that relate to a first perspective of the environment of the virtual located experienced by the first participant, the encoded feature data of the second participant, and a first environment data of the environment of the virtual location to generate a first virtual representation of the second participant in the environment of the virtual location from the perspective of the first participant;
wherein the second processing element processes the user perspective modification data of the second participant, the first extracted feature data of the first participant, and a second environment data of the environment of the virtual location to generate a second virtual representation of the first participant in the environment of the virtual location from the perspective of the second participant;
a first display element that displays the first virtual representation to the first participant at the first location; and
a second display element that displays the second virtual representation to the second participant at the second location.

25. The system of claim 24, further comprising:
a first receive element coupled to the first processing element that receives the encoded feature data of the second participant transmitted by the second transmit element; and
a second receive element coupled to the second processing element that receives the extracted feature data of the first participant transmitted by the first transmit element.

26. The system of claim 25, further comprising the first transmitter transmitting the first plurality of perspective data of the first participant that is received by the second receive element and the second transmitter transmitting the user perspective modification data of the second participant that is received by the first receive element.

27. The system of claim 26, wherein an updated first virtual representation of the second participant is generated by the first processing element upon a change in at least one of the first plurality of perspective data of the first participant, the user perspective modification data of the second participant, the encoded feature data of the second participant, and the first environment data of the environment of the virtual location, and wherein an updated second virtual representation of the first participant is generated by the second processing element upon a change in at least one of the user perspective modification data of the second participant, the first plurality of perspective data of the first participant, the extracted feature data of the first participant, and the second environment data of the environment of the virtual location.

28. The system of claim 24, wherein the first display element is a head mounted display worn by the first participant and further comprising:
a plurality of capture elements of the head mounted display that capture the plurality of cued data.

29. The system of claim 24, wherein the first processing element further comprises a view generation element that generates first and second views of the first virtual presentation of the second participant that are rendered by a rendering element and displayed by the first display element to at least one eye of the first participant.

30. An apparatus that supports a teleconference in an environment of a virtual location between a first participant at a first location and a second participant at a second location, comprising:
a receive element that receives a first plurality of user perspective modification data captured from the first participant and relating to a first perspective of the environment of the virtual location experienced by the first participant and a first plurality of encoded feature data captured from the second participant;
a processing element coupled to the receive element that processes the first plurality of user perspective modification data, the first plurality of encoded feature data and environment data about the environment of the virtual location to generate a virtual representation of the second participant in the environment of the virtual location from the perspective of the first participant;
a rendering element coupled to the processing element that renders the virtual representation of the second participant for display; and
a display element that displays the rendered virtual representation
wherein the processing element updates the virtual representation of the second participant upon a change in one or more of the first plurality of user perspective modification data, the first plurality of encoded feature data and the environment data.

31. The apparatus of claim 30, wherein the first plurality of user perspective modification data is captured from the first participant by a first tracking element under control of the first participant and wherein the second plurality of user perspective modification data is captured from the second participant by a second tracking element under control of the second participant.

32. The apparatus of claim 30, wherein the processing element further updates the virtual representation of the second participant upon a change in a second plurality of user perspective modification data relating to a second perspective of an environment of the virtual location experienced by the second participant.

33. The apparatus of claim 30, wherein the processing element maps the first plurality of encoded feature data to a three-dimensional model of the second participant in accordance with the first plurality of user perspective modification data and the environment data to generate the virtual representation of the second participant.

34. The apparatus of claim 30, wherein the virtual representation of the second participant comprises a virtual image component generated by the processing element from the first plurality of encoded feature data of the second participant.

35. The apparatus of claim 34, wherein the virtual representation further comprises a virtual audio component generated by the processing element from one or more of the first plurality of user perspective modification data of the first participant and an audio representation of the environment of the virtual location.

36. The apparatus of claim 30, wherein the audio representation comprises one or more of a first audio component as experienced by the first participant in the environment, a second audio component as experienced by the second participant in the environment, and an ambient component of the environment in the virtual location.

37. The apparatus of claim 36, wherein the virtual audio component is changed by a change in one or more of the first audio component as experienced by the first participant in the environment, the second audio component as experienced by the second participant in the environment, and the ambient component of the environment in the virtual location.

38. The apparatus of claim 30, wherein the first plurality of user perspective modification data from the first participant comprises one or more of head movement of the first participant and a relative position of the first participant in the environment of the virtual location.

39. The apparatus of claim 30, further comprising:
a transmit element coupled to the processing element that transmits a second plurality of encoded feature data captured from the first participant.

40. The apparatus of claim 30, wherein the first location is a local location and the second location is a remote location.

* * * * *